US012621230B2

(12) United States Patent
Varga et al.

(10) Patent No.: US 12,621,230 B2
(45) Date of Patent: May 5, 2026

(54) TIME-SENSITIVE NETWORK (TSN) NODE AND METHOD OF OPERATION

(71) Applicant: Telefonaktiebolaget LM Ericsson (publ), Stockholm (SE)

(72) Inventors: Balázs Varga, Budapest (HU); Ferenc Fejes, Budapest (HU); János Farkas, Kecskemét (HU); György Miklós, Pilisborosjenö (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/834,707

(22) PCT Filed: Mar. 22, 2023

(86) PCT No.: PCT/IB2023/052812
§ 371 (c)(1),
(2) Date: Jul. 31, 2024

(87) PCT Pub. No.: WO2023/180952
PCT Pub. Date: Sep. 28, 2023

(65) Prior Publication Data
US 2025/0132999 A1     Apr. 24, 2025

Related U.S. Application Data

(60) Provisional application No. 63/322,303, filed on Mar. 22, 2022.

(51) Int. Cl.
*H04L 47/34* (2022.01)
*H04L 43/0817* (2022.01)
(Continued)

(52) U.S. Cl.
CPC ...... *H04L 43/0817* (2013.01); *H04L 43/0823* (2013.01); *H04L 45/24* (2013.01)

(58) Field of Classification Search
CPC . H04L 43/0817; H04L 43/0823; H04L 45/24; H04L 47/2441; H04L 47/34; H04L 47/32
(Continued)

(56) References Cited

U.S. PATENT DOCUMENTS

| | | | |
|---|---|---|---|
| 2020/0106710 A1* | 4/2020 | Ryoo | H04L 47/726 |
| 2020/0107213 A1* | 4/2020 | Park | H04L 12/1407 |

(Continued)

FOREIGN PATENT DOCUMENTS

| | | |
|---|---|---|
| WO | 2021180910 A1 | 9/2021 |
| WO | 2021180911 A1 | 9/2021 |

OTHER PUBLICATIONS

"Frame Replicaton and Elimination for Reliability", IEEE Standard for Local and metropolitan area networks; IEEE Computer Society; IEEE Std 802.1CB™-2017; New York, NY, 2017, pp. 1-102.
(Continued)

*Primary Examiner* — Meng Vang
(74) *Attorney, Agent, or Firm* — Murphy, Bilak & Homiller, PLLC

(57) ABSTRACT

Embodiments include methods performed by a time-sensitive network (TSN) node configured for frame replication and elimination for reliability (FRER). Such methods include receiving a plurality of member streams via a corresponding plurality (n) of disjoint paths in the TSN. Each member stream includes a replication of packets comprising a stream. Such methods include performing the following diagnostics on the received member streams: a first group of diagnostics related to member stream failures, a second group of diagnostics related to packets received out-of-window, a third group of diagnostics related to stream outages, and a fourth group of diagnostics related to recovery timeouts for the TSN node. Other embodiments include TSN nodes configured to perform such methods.

20 Claims, 7 Drawing Sheets

(51) Int. Cl.
H04L 43/0823 (2022.01)
H04L 45/24 (2022.01)
(58) Field of Classification Search
USPC ......................................................... 709/224
See application file for complete search history.

(56) References Cited

U.S. PATENT DOCUMENTS

2020/0259896 A1* 8/2020 Sachs ...................... H04L 67/12
2021/0021520 A1* 1/2021 Wetterwald ............. H04L 47/12
2022/0377823 A1* 11/2022 Elazzouni ............. H04W 76/15

OTHER PUBLICATIONS

"IEEE P802.1CB™M/D2.4", Draft Standard for Local and metropolitan area networks—Frame Replication and Elimination for Reliability, Jul. 2016, pp. 1-109.
"3rd Generation Partnership Project; Technical Specification Group Services and System Aspects; System architecture for the 5G System (5GS); Stage 2 (Release 16)", 3GPP TS 23.501 V16.4.0, Mar. 2020, pp. 1-430.
Finn, N., et al., "Deterministic Networking Architecture draft-ietf-detnet-architecture-09", Oct. 22, 2018, pp. 1-42.
Varga, B., et al., "Deterministic Networking (DetNet): Packet Ordering Function draft-varga-detnet-pof-03", Deterministic Networking (DetNet): Packet Ordering Function, Apr. 25, 2022, pp. 1-12.

* cited by examiner

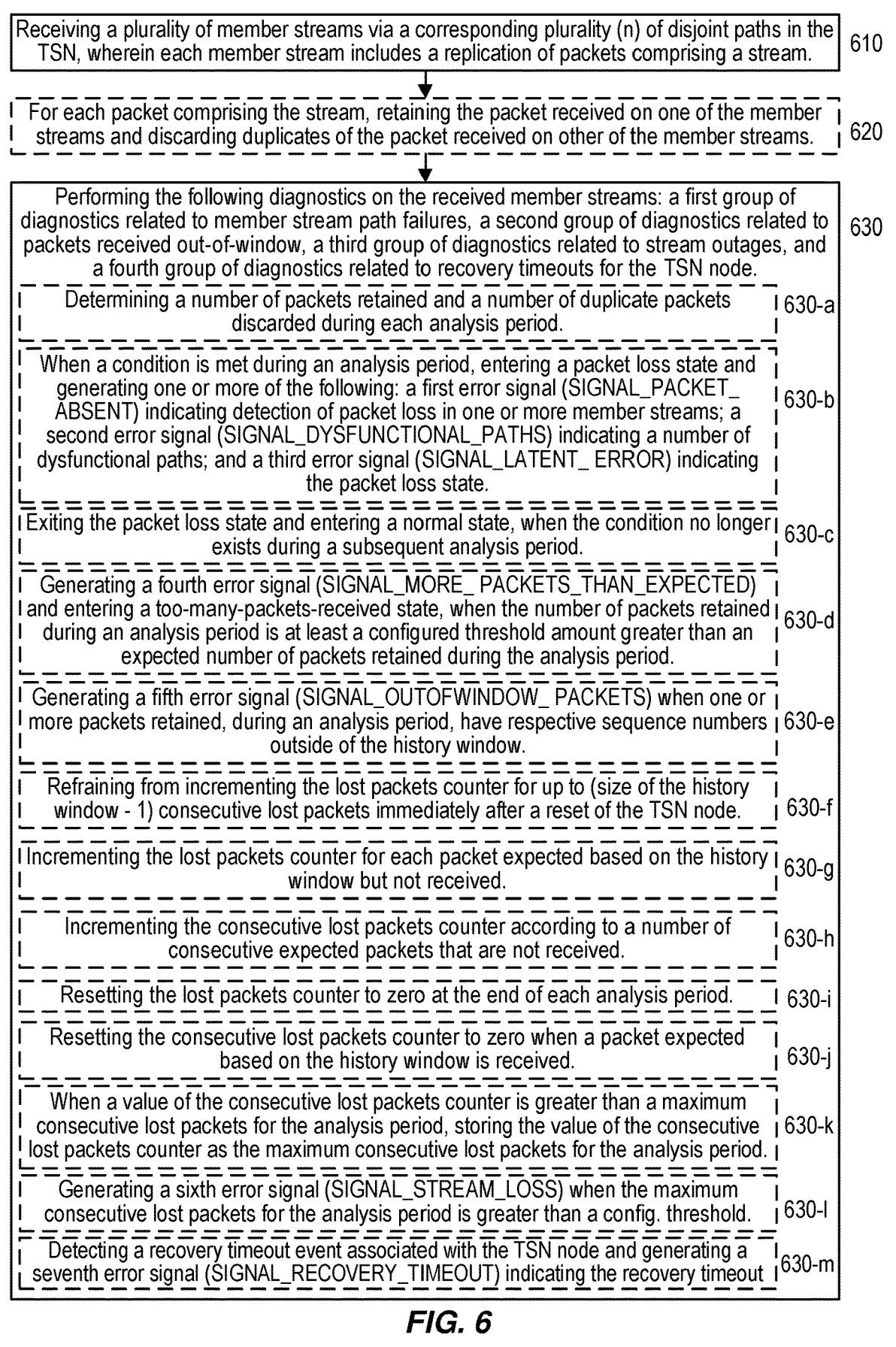

Receiving a plurality of member streams via a corresponding plurality (n) of disjoint paths in the TSN, wherein each member stream includes a replication of packets comprising a stream.  | 610

For each packet comprising the stream, retaining the packet received on one of the member streams and discarding duplicates of the packet received on other of the member streams.  | 620

Performing the following diagnostics on the received member streams: a first group of diagnostics related to member stream path failures, a second group of diagnostics related to packets received out-of-window, a third group of diagnostics related to stream outages, and a fourth group of diagnostics related to recovery timeouts for the TSN node.  | 630

Determining a number of packets retained and a number of duplicate packets discarded during each analysis period.  | 630-a When a condition is met during an analysis period, entering a packet loss state and generating one or more of the following: a first error signal (SIGNAL_PACKET_ ABSENT) indicating detection of packet loss in one or more member streams; a second error signal (SIGNAL_DYSFUNCTIONAL_PATHS) indicating a number of dysfunctional paths; and a third error signal (SIGNAL_LATENT_ ERROR) indicating the packet loss state.  | 630-b Exiting the packet loss state and entering a normal state, when the condition no longer exists during a subsequent analysis period.  | 630-c Generating a fourth error signal (SIGNAL_MORE_ PACKETS_THAN_EXPECTED) and entering a too-many-packets-received state, when the number of packets retained during an analysis period is at least a configured threshold amount greater than an expected number of packets retained during the analysis period.  | 630-d Generating a fifth error signal (SIGNAL_OUTOFWINDOW_ PACKETS) when one or more packets retained, during an analysis period, have respective sequence numbers outside of the history window.  | 630-e Refraining from incrementing the lost packets counter for up to (size of the history window - 1) consecutive lost packets immediately after a reset of the TSN node.  | 630-f Incrementing the lost packets counter for each packet expected based on the history window but not received.  | 630-g Incrementing the consecutive lost packets counter according to a number of consecutive expected packets that are not received.  | 630-h Resetting the lost packets counter to zero at the end of each analysis period.  | 630-i Resetting the consecutive lost packets counter to zero when a packet expected based on the history window is received.  | 630-j When a value of the consecutive lost packets counter is greater than a maximum consecutive lost packets for the analysis period, storing the value of the consecutive lost packets counter as the maximum consecutive lost packets for the analysis period.  | 630-k Generating a sixth error signal (SIGNAL_STREAM_LOSS) when the maximum consecutive lost packets for the analysis period is greater than a config. threshold.  | 630-l Detecting a recovery timeout event associated with the TSN node and generating a seventh error signal (SIGNAL_RECOVERY_TIMEOUT) indicating the recovery timeout  | 630-m

*FIG. 6*

COMMUNICATION SYSTEM
700

HOST
716

TELECOMMUNICATION NETWORK
702

CORE NETWORK
706

CORE NETWORK
NODE
708

ACCESS NETWORK
704

NETWORK NODE
710A

NETWORK NODE
710B

UE
712A

UE
712B

HUB
714

UE
712C

UE
712D

TIME-SENSITIVE NETWORK (TSN) NODE AND METHOD OF OPERATION

TECHNICAL FIELD

The present disclosure relates generally to the field of wireless networks and more specifically to improved diagnostics for errors or other conditions that can occur in time-sensitive network (TSN) nodes configured for frame replication and elimination for reliability (FRER).

BACKGROUND

Industry 4.0 is a term used to refer to a current trend of automation and data exchange in manufacturing. It can include concepts and/or technologies such as cyber-physical systems, the Internet of things (IoT), cloud computing, and cognitive computing. Industry 4.0 is also referred to as the fourth industrial revolution or "I4.0" for short. One scenario or use case for Industry 4.0 is the so-called "smart factory," which is also referred to as Industrial Internet of Things (IIoT).

There are four common principles associated with Industry 4.0. First, "interoperability" requires the ability to connect machines, devices, sensors, and people to communicate with each other via the Internet of Things (IoT) or the Internet of People (IoP). Second, "information transparency" requires information systems to have the ability to create a virtual copy of the physical world by enriching digital models (e.g., of a smart factory) actual with sensor data. For example, this can require the ability to aggregate raw sensor data to higher-value context information.

Third, "technical assistance" requires assistance systems to be able to support humans by aggregating and visualizing information comprehensively for making informed decisions and solving urgent problems on short notice. This principle can also refer to the ability of cyber physical systems to physically support humans by conducting a range of tasks that are unpleasant, too exhausting, or unsafe for their human co-workers. Finally, cyber physical systems should have the ability to make decentralized decisions and to perform their tasks as autonomously as possible. In other words, only in the case of exceptions, interferences, or conflicting goals, should tasks be delegated to a higher level.

These principles associated with Industry 4.0 support various use cases that place many requirements on a network infrastructure. Simpler use cases include plant measurement while more complex use cases include precise motion control in a robotized factory cell. To address these requirements, the IEEE 802.1 working group (particularly, task group TSN) has developed a Time Sensitive Networking (TSN) standard. TSN is based on the IEEE 802.3 Ethernet standard, a Layer-2 protocol that is designed for "best effort" quality of service (QoS). TSN describes a collection of features intended to make legacy Ethernet performance more deterministic, including time synchronization, guaranteed low-latency transmissions, and improved reliability. The TSN features available today can be grouped into the following categories (shown below with associated IEEE specifications):

Time Synchronization (e.g., IEEE 802.1AS);
Bounded Low Latency (e.g., IEEE 802.1Qav, IEEE 802.1Qbu, IEEE 802.1Qbv, IEEE 802.1Qch, IEEE 802.1Qcr);
Ultra-Reliability (e.g., IEEE 802.1CB, IEEE 802.1Qca, IEEE 802.1Qci);

Network Configuration and Management (e.g., IEEE 802.1Qat, IEEE 802.1Qcc, IEEE 802.1Qcp, IEEE 802.1CS).

More specifically, 802.1CB specifies a technique called Frame Replication and Elimination for Reliability (FRER) that is intended to avoid frame loss due to equipment failure. FRER divides a Stream into one or more linked Member Streams, thus making the original Stream a Compound Stream. It replicates the packets of the Stream, splitting the copies into the multiple Member Streams, and then rejoins those Member Streams at one or more other points, eliminates the replica (or duplicate) packets, and delivers the reconstituted Stream from those points. Although FRER provides redundancy over maximally disjoint paths, it does not include failure detection and/or switchover.

Deterministic Networking (DetNet) is an effort by the Internet Engineering Task Force (IETF) towards specifying deterministic data paths for real-time applications with extremely low data loss rates, packet delay variation (jitter), and bounded latency, such as audio and video streaming, industrial automation, and vehicle control. DetNet operates at the Internet Protocol (IP) layer (i.e., Layer 3) by using a Software-Defined Networking (SDN) layer to provide Integrated Services (IntServ) and Differentiated Services (DiffServ) integration. Moreover, DetNet is intended to deliver service over Layer 2 technologies such as multi-protocol label switching (MPLS) and IEEE 802.1 TSN.

DetNet includes a function similar to FRER, called Packet Replication and Elimination Function (PREF). This defined to simplify implementation and facilitate use of the same concept in both Layer-2 (TSN) and Layer-3 (DetNet) networks. In practice, IEEE 802.1CB provides implementation guideline for IETF DetNet PREF.

SUMMARY

However, the error detection functionality in 802.1CB is very limited and provides little or no information about the nature and the severity of an error. For example, 802.1CB error detection does not indicate when there is a failure of a path associated with a stream, nor how many paths are failing. Likewise, 802.1CB error detection does not indicate whether packets are being dropped randomly nor whether more packets are being received than expected. More generally, 802.1CB is not equipped with diagnostics, which inhibits deployment of this technology that is intended to provide ultra-reliability.

An object of embodiments of the present disclosure is to improve reliability of time-sensitive networking, such as by facilitating solutions to overcome the exemplary problems summarized above and described in more detail below.

Embodiments include various methods (e.g., procedures) for a TSN node configured for FRER. These exemplary methods can include receiving a plurality of member streams via a corresponding plurality (n) of disjoint paths in the TSN. Each member stream includes a replication of packets comprising a stream. These exemplary methods can also include performing the following diagnostics on the received member streams:

a first group of diagnostics related to member stream failures,
a second group of diagnostics related to packets received out-of-window,
a third group of diagnostics related to stream outages, and
a fourth group of diagnostics related to recovery timeouts for the TSN node.

In some embodiments, these exemplary methods can also include, for each packet comprising the stream, retaining the packet received on one of the member streams and discarding duplicates of the packet received on other of the member streams.

In some embodiments, the first, second, and third groups of diagnostics are performed on the received member streams during each of a plurality of consecutive analysis periods. In some of these embodiments, performing the first group of diagnostics for each analysis period includes determining a number of packets retained and a number of duplicate packets discarded during each analysis period. In some of these embodiments, performing the first group of diagnostics for each analysis period can also include, when the number of duplicate packets discarded is at least a configured threshold amount less than ((n minus 1) times the number of packets retained during an analysis period), entering a packet loss state and generating one or more of the following:

a first error signal (SIGNAL_PACKET_ABSENT) indicating detection of packet loss in one or more member streams;

a second error signal (SIGNAL_DYSFUNCTIONAL_ PATHS) indicating a number of dysfunctional paths; and a third error signal (SIGNAL_LATENT_ERROR) indicating the packet loss state.

In some variants, the number of dysfunctional paths (e.g., indicated by the second error signal) is based on a ratio between the following during the analysis period: the number of duplicate packets discarded and the number of packets retained.

In some of these embodiments, performing the first group of diagnostics for each analysis period can also include exiting the packet loss state and entering a normal state of operation when the number of duplicate packets discarded during a subsequent analysis period is no longer at least the configured threshold amount less than ((n minus 1) times the number of packets retained during the subsequent analysis period).

In some embodiments, performing the first group of diagnostics for each analysis period can also include generating a fourth error signal (SIGNAL_MORE_PACKET-S_THAN_EXPECTED) and entering a too-many-packets-received state, when the number of packets retained during an analysis period is at least a configured threshold amount greater than an expected number of packets retained during the analysis period. In some variants of these embodiments, the fourth error signal (SIGNAL_MORE_PACKETS_T-HAN_EXPECTED) includes an indication of how many packets more than the expected number of packets were retained, as a percentage of number of expected packets from each member stream during the analysis period.

In some embodiments, each packet includes a sequence number and the TSN node is configured with a lost packets counter and a history window indicating a range of consecutive packet sequence numbers. In some of these embodiments, performing the second group of diagnostics for each analysis period can include generating a fifth error signal (SIGNAL_OUTOFWINDOW_PACKETS) when one or more packets retained, during an analysis period, have respective sequence numbers outside of the history window.

In some variants, the TSN node is configured with a rogue packet counter, which is incremented by a number of packets retained during an analysis period with sequence numbers outside of the history window. In such variants, the fifth error signal (SIGNAL_OUTOFWINDOW_PACKETS) is generated when a value of the rogue packet counter for an analysis period is greater than a previous value of the rogue packet counter for a most recent analysis period. In some further variants, the fifth error signal (SIGNAL_OUTOF-WINDOW_PACKETS) includes the value of the rogue packet counter for the analysis period.

In some of these embodiments, performing the third group of diagnostics for each analysis period can include refraining from incrementing the lost packets counter for up to (size of the history window minus 1) consecutive lost packets immediately after a reset of the TSN node.

In some of these embodiments, the TSN node is configured with a consecutive lost packets counter and performing the third group of diagnostics for each analysis period can include the following operations:

incrementing the lost packets counter for each packet expected based on the history window but not received;

incrementing the consecutive lost packets counter according to a number of consecutive expected packets that are not received;

resetting the lost packets counter to zero at the end of each analysis period; and resetting the consecutive lost packets counter to zero when a packet expected based on the history window is received.

In some variants, performing the third group of diagnostics for each analysis period can also include, when a value of the consecutive lost packets counter is greater than a maximum consecutive lost packets for the analysis period, storing the value of the consecutive lost packets counter as the maximum consecutive lost packets for the analysis period. In some further variants, performing the third group of diagnostics for each analysis period can also include generating a sixth error signal (SIGNAL_STREAM_LOSS) when the maximum consecutive lost packets for the analysis period is greater than a configurable threshold amount. In some of these variants, the sixth error signal (SIGNAL_ STREAM_LOSS) includes the following for the analysis period: the maximum consecutive lost packets, and a total number of lost packets as indicated by the lost packets counter.

In some embodiments, performing the fourth group of diagnostics for each analysis period can include detecting a recovery timeout event associated with the TSN node and generating a seventh error signal (SIGNAL_RECOVERY_ TIMEOUT) indicating the recovery timeout.

Other embodiments include network nodes (e.g., base station, eNB, gNB, ng-eNB, etc. or components thereof) configured to perform operations corresponding to any of the exemplary methods described herein. Other embodiments include non-transitory, computer-readable media storing program instructions that, when executed by processing circuitry of network nodes, configure the network nodes to perform operations corresponding to any of the exemplary methods described herein.

These and other embodiments can provide improved diagnostic outputs for TSN nodes supporting FRER, which facilitates detection of various errors, misconfigurations, and possible attacks against member streams. As such, embodiments can facilitate more accurate detection of network failure scenarios, thereby providing increased reliability of deployed TSN/DetNet.

These and other objects, features, and advantages of embodiments of the present disclosure will become apparent upon reading the following Detailed Description in view of the Drawings briefly summarized below.

BRIEF DESCRIPTION OF THE DRAWINGS

FIG. 6 shows a flow diagram illustrating an exemplary method (e.g., procedure) for a TSN node configured for FRER, according to various embodiments of the present disclosure.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objects, features, and advantages of the enclosed embodiments will be apparent from the following description.

Currently the fifth generation ("5G") of cellular systems, also referred to as New Radio (NR), is being standardized within the Third-Generation Partnership Project (3GPP). NR is developed for maximum flexibility to support many different use cases. These include mobile broadband, machine type communication (MTC), ultra-reliable low-latency communications (URLLC), device-to-device (D2D), etc. The achievable latency and reliability performance of NR are important for these and other use cases related to IIOT and/or Industry 4.0. In order to extend NR applicability for such use cases, support for time synchronization in the 5G system via time sensitive network (TSN) has been defined in 3GPP TS 23.501 (v16.4.0).

At a high level, the 5G network architecture consists of a Next Generation radio access network (NG-RAN) and a 5G core network (5GC). The NG-RAN includes various gNodeB's (gNBs, also referred to as base stations) serving cells by which wireless devices (also referred to as user equipment, or UEs) communicate. The gNBs can be connected to the 5GC via one or more NG interfaces and to each other via Xn interfaces. Each of the gNBs can support frequency division duplexing (FDD), time division duplexing (TDD), or a combination thereof.

Figures 1, 2:
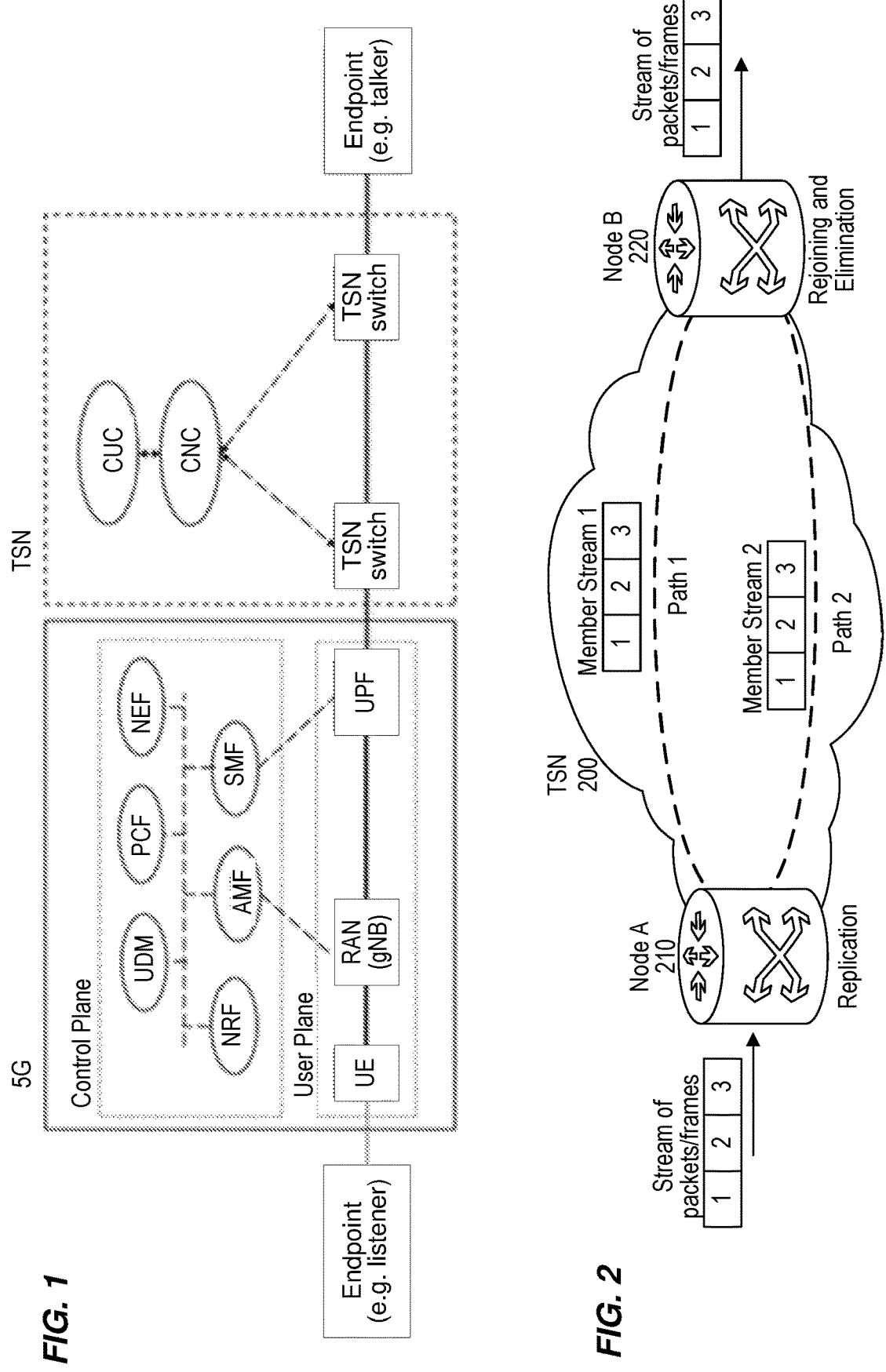
FIG. 1 is a block diagram illustrating an exemplary arrangement for interworking between a 5G network and an exemplary TSN network.
FIG. 2 shows an example TSN arrangement that employs 802.1CB FRER.

To support IIoT uses cases, a 5G network (e.g., NG-RAN and 5GC) should deliver highly accurate timing information from an external TSN network to TSN endpoints connected to the 5G network, e.g., via UEs. FIG. 1 is a block diagram illustrating an exemplary arrangement for interworking between a 5G network and an exemplary TSN network. In the following discussion, a device connected to the 5G network is referred to as 5G endpoint, and a device connected to the TSN domain is referred to as TSN endpoint. The arrangement shown in FIG. 1 includes a Talker TSN endpoint and a Listener 5G endpoint connected to a UE. In other arrangements, a UE can instead be connected to a TSN network comprising at least one TSN bridge and at least one TSN endpoint. In this configuration, the UE can be part of a TSN-5G gateway.

The TSN can include a grandmaster clock (TSN GM) that serves as the definitive timing source for TSN endpoints. At a high level, the 5G network in FIG. 1 should appear to the connected TSN as a switch or bridge that delivers the TSN GM timing to the connected endpoints in compliance with the requirements in IEEE 802.1AS. However, the 5G network does not use the TSN GM as its own timing source, but instead relies on a 5G system clock (5GSC) that is distributed among the various network nodes or functions. As such, one or more timing relationships between TSN GM and 5GSC may need to be determined and/or derived to facilitate transit of the TSN GSM to the connected end station in a compliant manner.

At a high level, the time synchronization illustrated in FIG. 1 requires NG-RAN nodes (e.g., gNBs) to be synchronized to the 5G network reference time (i.e., based on 5GSC) while TSN GM timing is delivered to UEs and endpoints transparently through the 5G network using higher-layer generalized precision time protocol (gPTP) signaling. For 5GSC synchronization, a UE relies on its serving gNB providing reference time periodically, either via broadcast or unicast signaling. The nominal periodicity Tn of gNB reference time delivery is left to network implementation. However, Tn can reflect the UE clock stability and gNB clock stability in relation to the 5G GM clock used as the basis of the 5G reference time, etc.

The following description uses IEEE 802.1CB terminology and variable names where appropriate, denoted as "VariableName". Some embodiments of the present disclosure include additional variables, functions, and/or parameters related to new features for IEEE 802.1CB and follow the same naming conventions.

As briefly mentioned above, 802.1CB specifies a Frame Replication and Elimination for Reliability (FRER) technique that is intended to avoid frame loss due to equipment failure in TSN. FRER divides a Stream into one or more linked Member Streams, thus making the original Stream a Compound Stream. It replicates the packets of the Stream, splitting the copies into the multiple Member Streams, and then rejoins those Member Streams at one or more other points, eliminates the replica (or duplicate) packets, and delivers the reconstituted Stream from those points.

FIG. 2 shows an exemplary TSN (200) that employs 802.1CB FRER. In this exemplary arrangement, a stream of packets or frames arrives at node A (210), which divides the stream into member streams 1 and 2. Node A replicates packets 1-3 to be carried on both member streams and transmits these member streams over maximally disjoint paths 1 and 2 to node B (220). This node rejoins member streams 1 and 2 and eliminates any duplicate packets received. In case there is blockage or outage on either of paths 1-2, the member stream carried on the other path will still be received by node B.

Although FRER provides redundancy over maximally disjoint paths, it does not include failure detection and/or switchover. For detecting duplicate packets, the 802.1CB elimination function evaluates a "sequence_number" sub-parameter of a packet of one or more Member Streams passed up from the lower layers. The "SequenceHistory" variable maintains a history of the "sequence_number" sub-parameters of recently received packets. During duplicate elimination the "sequence_number" is checked against a history window "frerSeqRcvyHistoryLength"; packets outside this window are discarded as invalid. Under normal operation, received packets are within the history window and only duplicates are dropped.

802.1CB defines recovery functions, recovery algorithms, and related counters. As part of a sequence recovery function, 802.1CB defines a latent error detection function that monitors managed objects associated with a single instance of a base recovery function. Latent error detection operates on the assumption that, in a properly functioning Compound Stream employing "n" paths into the current system, there will be "n−1" packets discarded for every packet passed through the base recovery function. The latent error detection function issues a SIGNAL_LATENT_ERROR when that assumption is violated.

However, the error detection functionality in 802.1CB is severely limited and provides little or no information about the nature and the severity of an error. For example, 802.1CB error detection does not indicate when there is a failure of a path associated with a Stream, nor how many paths are failing. Likewise, 802.1CB error detection does not indicate whether packets are being dropped randomly nor whether more packets are being received than expected.

The LatentErrorTest function (defined in 802.1CB section 7.4.4.4) cannot identify and inform the network operator about these and other errors and/or conditions. Some errors are not detected/signaled. For example, the LatentErrorTest function does not detect loss spikes on all paths, which can result in packet loss for the Compound Stream. Furthermore, 802.1CB does not define any functions/signals to detect and indicate out-of-window packet drops, which may be due to a Member Stream path with large delay.

More generally, 802.1CB is not equipped with diagnostics necessary for actual deployments. For example, the counters for the recovery functions provide a basis to check system state but do not support detailed diagnosis of actual FRER states and/or operation. Typical counter operation results in FALSE POSITIVE error detection in some scenarios. As a more specific example, the impact of a TakeAny scenario (i.e., recovery timeout) is not considered in counting lost packets, therefore "frerCpsSeqRcvyLostPackets" variable may show packet loss higher than actual. Another false positive example is that after recovery of a failure, SIGNAL_LATENT_ERROR may remain active until the execution of the LatentErrorReset routine.

As another example, SIGNAL_LATENT_ERROR is the only error signal defined by 802.1CB. This signal is not specific enough; it provides no information about the severity nor the root cause of an error.

Embodiments of the present disclosure address these and other problems, issues, and/or difficulties by providing a richer set of operational information about 802.1CB FRER functionality. According to various embodiments, nodes participating in FRER include an enhanced "diagnostic entity" that analyzes existing and newly defined counters and/or variables to provide more detailed diagnostics that conventional techniques. Furthermore, the diagnostic entity creates and sends error-related signals ("SIGNAL" in 802.1CB terminology) to inform the network operator. According to various embodiments, the diagnostic entity output facilitates detection of one or more of the following:

errors related to Paths, Member Streams, and/or Compound Stream;
    hints for possible misconfiguration,
    severity-level of errors; and
    possible attacks against the Stream(s).

Embodiments can provide various benefits and/or advantages. For example, embodiments can ensure much more accurate detection of network failure scenarios, thereby providing increased reliability of deployed TSN/DetNet networks.

Figures 3, 4, 5:
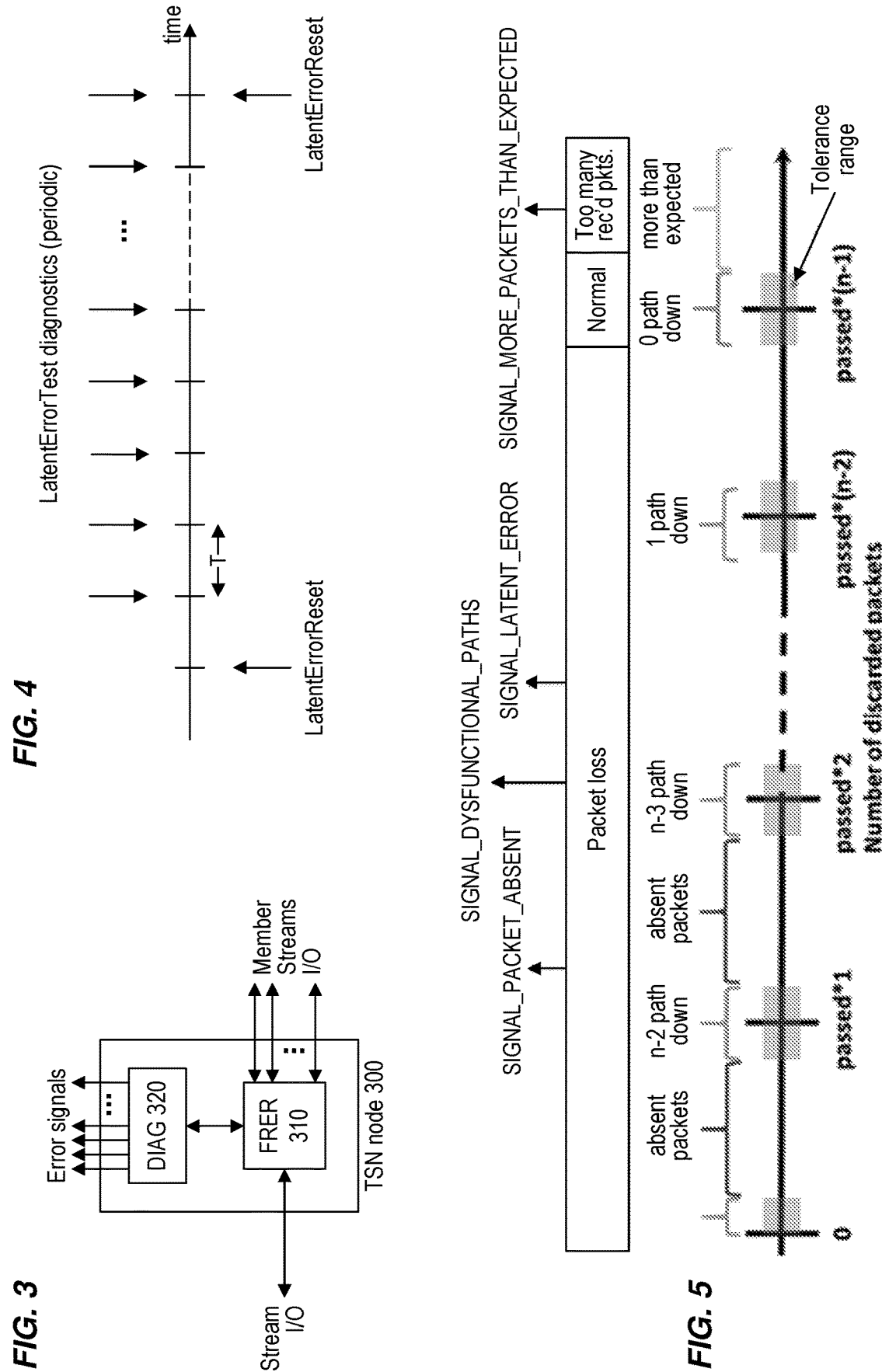
FIG. 3 is a block diagram of a TSN node according to various embodiments of the present disclosure.
FIG. 4 shows an exemplary timeline for periodic diagnostic monitoring, according to various embodiments of the present disclosure.
FIG. 5 shows an exemplary diagnostic monitoring of discarded packets that generates various error signals related to member stream failures, according to various embodiments of the present disclosure.

FIG. 3 is a block diagram of a TSN node according to various embodiments of the present disclosure. The TSN node (300) includes an FRER function (310) that can perform replication of an input stream into multiple output member streams, as well as rejoining of input member streams and duplicate elimination to form an output stream. In other words, the FRER function shown in FIG. 3 has both transmit and receive functionality such as described above in relation to FIG. 2.

TSN node 300 also includes a diagnostic entity or function (DIAG, 320) that periodically analyzes FRER-related functions, counters, states, etc., detects various error conditions according to pre-defined thresholds, and outputs corresponding error signals that are denoted "SIGNAL_X", where X corresponds to various phrases that are descriptive of the various error conditions. In some embodiments, DIAG can generate the following error signals related to Node/Stream level events:

SIGNAL_RECOVERY_TIMEOUT: triggered by node-internal RECOVERY_TIMEOUT event; and
    SIGNAL_DYSFUNCTIONAL_PATHS(#): A signal generated together with existing SIGNAL_LATENT_ERROR, indicating the number of dysfunctional paths (e.g., as an unsigned integer).

In some embodiments, DIAG can generate the following error signals related to packet level events on a Stream:

SIGNAL_PACKET_ABSENT: indicates detection of random or occasional packet loss in Member Stream(s). Note that the Compound Stream may be unaffected by the loss(es).

SIGNAL_PACKET_LOSS (#1, #2): indicates a non-recoverable error was detected. There are missing packets in the Compound Stream, caused by packet loss on all Member Stream. The first parameter (#1) indicates number of lost packets and the second parameter (#2) indicates maximum consecutive lost packets.

SIGNAL_MORE_PACKETS_THAN_EXPECTED (%): indicates that more packets were received and dropped as duplicate for a Stream, than expected based on configured number of Member Streams. The % parameter (which can be an unsigned integer) indicates volume of extra traffic in percentage of a single Member Stream traffic volume during the examined time period. The root cause of this error could be, for example, a misconfigured replication node.

SIGNAL_OUTOFWINDOW_PACKETS (#): indicates number of packets dropped for being out-of-window.

DIAG generates the above error signals when the events occur (e.g., SIGNAL_RECOVERY_TIMEOUT) or in conjunction with a periodic diagnostic monitoring (e.g., every 2 seconds). Note that periodicity (T) of diagnostic monitoring may be fixed, variable, pre-configured, user-configured, etc. FIG. 4 shows an exemplary timeline for periodic diagnostic monitoring, according to some embodiments of the present disclosure. The DIAG entity runs the LatentErrorTest function every period T to analyze FRER-related functions, counters, states, etc., detect various error conditions according to pre-defined thresholds, and output corresponding error signals described above. Additionally, the LatentErrorReset function is performed periodically or occasionally.

A first group of diagnostics relate to member stream failures. FIG. 5 shows an exemplary diagnostic monitoring of discarded packets that generates various error signals related to member stream failures. The example shown in FIG. 5 is based on n total paths being configured for replication. The diagnostic entity may reuse the existing "frerSeqRcvyLatentErrorDifference" variable. The diagnostic entity can determine and/or assign one of the following states for a member stream based on a number of discarded packets during an analysis period:

1. Normal operation: no error signal generated;
2. Packet loss: SIGNAL_LATENT_ERROR, SIGNAL_DYSFUNCTIONAL_PATHS (#), SIGNAL_PACKET_ABSENT generated; and
3. Too many packets received: SIGNAL_MORE_PACKETS_THAN_EXPECTED generated.

In the example shown in FIG. 5, DIAG detects in the first analysis period that n−2 paths are down based on the number of discarded packets being equal to the number of passed packets during the analysis period. This determination can be based on an imperfection tolerance range set by the operator (e.g., calculated based on stream characteristics, delay differences between the paths, etc.). Since this is the first instance of absent packets the diagnostic entity provides a SIGNAL_PACKET_ABSENT error signal.

The lost packets continue and DIAG detects in the second analysis period that n−3 paths are down based on the number of discarded packets being equal to twice the number of passed packets during the second analysis period. DIAG provides a SIGNAL_DYSFUNCTIONAL_PATHS error signal, indicating n−3 paths are down. DIAG also provides a SIGNAL_LATENT_ERROR error signal.

At later analysis periods, DIAG detects only one path down based on number of discarded packets being equal to (n−2) times the number of passed packets during the later analysis period. Subsequently, DIAG detects zero paths are down (all up) based on number of discarded packets being equal to (n−1) times the number of passed packets during the subsequent analysis period. At that point, the diagnostic entity indicates a "normal" state for all member streams. However, DIAG later detects more received packets than expected, changes the state to "too many packets received", and provides the SIGNAL_MORE_PACKETS_THAN_EXPECTED error signal.

No new configuration parameters are needed for the first group of diagnostics, which may reuse the existing "frerSeqRcvyLatentErrorDifference" threshold. An operator can make the detection algorithm more sensitive or more relaxed based on this threshold. If the difference between "frerCpsSeqRcvyDiscardedPackets" and "(frerSeqRcvyLatentErrorPaths−1)*frerCpsSeqRcvyPassedPackets" is smaller than this configured threshold, the algorithm determines the first state (normal operation).

In some embodiments, the following new variables can be introduced for the first group of diagnostics:

"frerCpsSeqRcvyDiscardedPacketsLast": used to store the value of "frerCpsSeqRcvyDiscardedPackets" from the most recent diagnostic monitoring period. This is used to prevent the diagnostic algorithm from carrying the errors forever.

"frerCpsSeqRcvyPassedPacketsLast": used to store the value of "frerCpsSeqRcvyPassedPackets" from the most recent diagnostic monitoring period. This is used to prevent the diagnostic algorithm from carrying the errors forever. Note that the existing LatentErrorTest function has its own reset mechanism to prevent rolling the error from previous iterations to the next iteration, i.e., the "CurBaseDifference" variable. However, this variable is insufficient for the additional diagnostics of the first group because it obscures important information about passed and discarded packets that is used for calculations.

The first group of diagnostics generates the following error signals, described in more detail above:

SIGNAL_LATENT_ERROR (existing);
SIGNAL_DYSFUNCTIONAL_PATHS (#);
SIGNAL_PACKET_ABSENT; and
SIGNAL_MORE_PACKETS_THAN_EXPECTED (%).

A second group of diagnostics relate to out-of-window packets. In a well-configured environment, the history window accounts for the maximum possible delay difference between paths. However, some feedback is required for the operator to ensure that the history window is configured properly in this manner.

Out-of-window packets may be related to attacks or configuration errors, both of which need intervention by the operator. Out-of-window packets are counted by the existing "frerCpsSeqRcvyRoguePackets" counter. This counter increases if any of the following occurs:

FRER related reset, with some of the packets being counted as rogue packets (e.g., due to initialization);

a malicious or failed user generates packets with incorrect sequence numbers;

packets on slow path(s) arrive too late for the configured history window; and delay increased on a path for one or more Member Streams, causing packets to arrive too late for the configured history window. Possible reasons for a delay increase include increase in load on an existing device in a path, addition of another device and/or more hops on a path, rerouting of a path, etc.

In some embodiments, the second group of diagnostics can include a new variable called "frerCpsSeqRcvyRoguePacketsLast", which can be used to store a value of existing variable "frerCpsSeqRcvyRoguePackets" from the most recent diagnostic monitoring period. If the current and most recent values of rogue packets differ, the diagnostic entity generates SIGNAL_OUTOFWINDOW_PACKETS error signal.

In other words, the second group of diagnostics generates SIGNAL_OUTOFWINDOW_PACKETS (#) when the sequence recovery function experiences one or more packets with sequence numbers outside the of history window, i.e., when the "frerCpsSeqRcvyRoguePackets" counter has changed since the last check. The current value of the "frerCpsSeqRcvyRoguePackets" is reported to the operator as the signal parameter (#).

A third group of diagnostics relate to stream outages. A stream can suffer outage when no packets are received from any of its paths. If this issue is serious and this situation lasts long, the existing reset mechanism can detect it when the RemainingTicks reaches 0 such that a node-internal "RECOVERY_TIMEOUT" event occurs.

However, relatively shorter stream outages ("stuttering") will remain undetected, even though such packet losses may negatively impact functionality and/or reliability of TSN applications. For example, the root cause of such problems could be an intermittent link failure or a replication node failure, both of which should be notified to the operator.

Accordingly, the third group of diagnostics provide a signal to the operator about a possible stream outage and/or stuttering. The operation of the detection algorithm is adjustable with a tolerance threshold to avoid detection of false positives, e.g., due to packet reordering. If sequence recovery reset occurs (and TakeAny is true), the algorithm does not immediately generate an error signal because the FRER function is under initialization.

Existing 802.1CB functionality counts lost packets in the "frerCpsSeqRcvyLostPackets" counter during the execution of the "ShiftSequenceHistory" function. However, the current "ShiftSequenceHistory" function does not consider the reset scenario and may count up to "frerSeqRecoveryHistoryLength-1" packets as false positive lost packets after a reset. Embodiments of the present disclosure address this shortcoming by refraining from increasing the "frerCpsSeqRcvyLostPackets" counter after reset for "frerSeqRecoveryHistoryLength-1" number of shift operations.

In addition to the lost packets, DIAG counts how many consecutive packets are lost, using a dedicated new variable, "frerCpsSeqRcvyConsecutiveLoss". The value of this variable is incremented each time "frerCpsSeqRcvyLostPackets" is incremented. But if the diagnostic function shifts out a non-zero value from the history window (i.e., the TSN node successfully receives a packet within the history window length), it resets "frerCpsSeqRcvyConsecutiveLoss" to zero.

If the value of the "frerCpsSeqRcvyConsecutiveLoss" is larger than the length of the previously known largest lost sequence, DIAG stores this value a new "frerCpsSeqRcvyConsecutiveLossMax" variable that stores the largest lost sequence. If the value of the "frerCpsSeqRcvyConsecutiveLoss" is larger than a new configurable threshold "frerCpsSeqRcvyOutageThreshold", DIAG generates a SIGNAL_STREAM_LOSS error signal.

DIAG resets the "frerCpsSeqRcvyConsecutiveLossMax" to zero per analysis (or diagnostic) period. A new guard variable "frerSkipLossAfterResetGuard" is used to prevent counting false positive lost packets after a sequence recovery reset.

To summarize, the following new variables can be introduced for the third group of diagnostics:

"frerCpsSeqRcvyConsecutiveLoss"—unsigned integer value that counts number of consecutive packets lost by the sequence recovery function. Incremented with each lost packet and reset to zero upon a received (not lost) packet.

"frerCpsSeqRcvyConsecutiveLossMax"—stores largest "frerCpsSeqRcvyConsecutive-Loss" value since the last call of the diagnostic function.

"frerCpsSeqRcvySkipLossAfterResetGuard"—prevents updated "ShiftSequenceHistory" function from counting false positive packet loss after a sequence recovery reset. The initial value of this variable is "frerSeqRecoveryHistoryLength-1", and it is decremented for every lost packet until reaching zero. The sequence history reset also sets this variable to its initial value.

As mentioned above, the third group of diagnostics can include a new configuration parameter, called "frerCpsSeqRcvyOutageThreshold". This can be an unsigned integer value that defines the size of gap in the sequence numbers (i.e., number of consecutive packets) that should be considered as a stream outage. This value should be set based on desired and/or preferred thresholds for false positives and missed detections of stream outages.

Upon detecting a stream outage (smaller than the "frerSeqRcvyHistoryLength"), DIAG generates a SIGNAL_STREAM_LOSS error signal. The signal handler can read from the "frerCpsSeqRcvyconsecutiveLossMax" variable how large the stream outage was. The two parameters (#1, #2) of SIGNAL_STREAM_LOSS indicate:

total number of lost packets, i.e., "frerCpsSeqRcvyLostPackets"; and maximum number of consecutive lost packets since the last iteration of the Diagnostic Tool, i.e., "frerCpsSeqRcvyconsecutiveLossMax".

A fourth group of diagnostics generate a SIGNAL_RECOVERY_TIMEOUT when a RECOVERY_TIMEOUT event happens. Such an event is not expected during normal operation, so it is desirable to notify the operator when one occurs. Unlike the above-described first through third groups of diagnostics that are run periodically, the fourth group of diagnostics is event-driven and is not run periodically. Note that SIGNAL_RECOVERY_TIMEOUT can notify about a RECOVERY_TIMEOUT event related to the VectorRecovery Algorithm or to the MatchRecovery Algorithm.

These embodiments described above can be further illustrated with reference to FIG. 6, which depicts an exemplary method (e.g., procedure) performed by a TSN node configured for frame replication and elimination for reliability (FRER). Put differently, various features and/or operations of the exemplary method described below correspond to various embodiments described above. Although the exemplary method is illustrated in FIG. 6 by specific blocks in a particular order, the operations corresponding to the blocks can be performed in a different order than shown and can be combined and/or divided into blocks having different functionality than shown. Optional blocks or operations are indicated by dashed lines.

The exemplary method shown in FIG. 6 can include the operations of block 610, in which the TSN node can receive a plurality of member streams via a corresponding plurality (n, e.g., "frerSeqRcvyLatentErrorPaths") of disjoint paths in the TSN, wherein each member stream includes a replication of packets comprising a stream. FIG. 2 shows an example of n=2 member streams received via n=2 disjoint paths. The exemplary method can also include the operations of block 630, in which the TSN node perform the following diagnostics on the received member streams:

a first group of diagnostics related to member stream failures, a second group of diagnostics related to packets received out-of-window, a third group of diagnostics related to stream outages, and a fourth group of diagnostics related to recovery timeouts for the TSN node.

In some embodiments, the exemplary method can also include the operations of block 620, where for each packet comprising the stream, the TSN node can retain the packet received on one of the member streams and discard duplicates of the packet received on other of the member streams.

In some embodiments, the first, second, and third groups of diagnostics are performed on the received member streams during each of a plurality of consecutive analysis periods.

In some of these embodiments, performing the first group of diagnostics for each analysis period in block 630 includes the operations of sub-block 630-*a*, where the TSN node can determine a number of packets retained (e.g., "frerCpsSeqRcvyPassedPackets") and a number of duplicate packets discarded (e.g., "frerCpsSeqRcvyDiscardedPackets") during each analysis period. In some of these embodiments, performing the first group of diagnostics for each analysis period in block 630 can also include the operations of sub-block 630-*b*, where when the number of duplicate packets discarded is at least a configured threshold amount less than ((n minus 1) times the number of packets retained during an analysis period), the TSN node can enter a packet loss state and generate one or more of the following:

a first error signal (SIGNAL_PACKET_ABSENT) indicating detection of packet loss in one or more member streams;

a second error signal (SIGNAL_DYSFUNCTIONAL_ PATHS) indicating a number of dysfunctional paths; and a third error signal (SIGNAL_LATENT_ERROR) indicating the packet loss state.

In some variants, the number of dysfunctional paths (e.g., indicated by the second error signal) is based on a ratio between the following during the analysis period: the number of duplicate packets discarded and the number of packets retained.

In some of these embodiments, performing the first group of diagnostics for each analysis period in block 630 can also include the operations of sub-block 630-*c*, where the TSN node can exit the packet loss state and enter a normal state of operation, when the number of duplicate packets discarded during a subsequent analysis period is no longer at least the configured threshold amount less than ((n minus 1) times the number of packets retained during the subsequent analysis period). In other words, the TSN node re-enters the normal state after the first subsequent analysis period in which condition detected in sub-block 630-*b* no longer exists.

In some embodiments, performing the first group of diagnostics for each analysis period in block 630 can also include the operations of sub-block 630-*d*, where the TSN node can generate a fourth error signal (SIGNAL_MORE_ PACKETS_THAN_EXPECTED) and enter a too-many-packets-received state, when the number of packets retained during an analysis period is at least a configured threshold amount greater than an expected number of packets retained during the analysis period. In some variants of these embodiments, the fourth error signal (SIGNAL_MORE_PACKET- S_THAN_EXPECTED) includes an indication of how many packets more than the expected number of packets were retained, as a percentage of number of expected packets from each member stream during the analysis period.

In some embodiments, each packet includes a sequence number and the TSN node is configured with a lost packets counter (e.g., "frerCpsSeqRcvyLostPackets") and a history window (e.g., via "frerSeqRcvyHistoryLength") indicating a range of consecutive packet sequence numbers. In some of these embodiments, performing the second group of diagnostics for each analysis period in block 630 can include the operations of sub-block 630-*e*, where the TSN node can generate a fifth error signal (SIGNAL_OUTOFWINDOW_ PACKETS) when one or more packets retained, during an analysis period, have respective sequence numbers outside of the history window.

In some variants, the TSN node is configured with a rogue packet counter (e.g., "frerCpsSeqRcvyRoguePackets"), which is incremented by a number of packets retained during an analysis period with sequence numbers outside of the history window. In such variants, the fifth error signal (SIGNAL_OUTOFWINDOW_PACKETS) is generated when a value of the rogue packet counter for an analysis period is greater than a previous value of the rogue packet counter for a most recent analysis period. In some further variants, the fifth error signal (SIGNAL_OUTOFWIN-DOW_PACKETS) includes the value of the rogue packet counter for the analysis period.

In some of these embodiments, performing the third group of diagnostics for each analysis period in block 630 can include the operations of sub-block 630-*f*, where the TSN node can refrain from incrementing the lost packets counter for up to (size of the history window minus 1) consecutive lost packets immediately after a reset of the TSN node.

In some of these embodiments, the TSN node is configured with a consecutive lost packets counter and performing the third group of diagnostics for each analysis period in block 630 includes the following operations, labelled with corresponding sub-block numbers:

(630-*g*) incrementing the lost packets counter for each packet expected based on the history window but not received;

(630-*h*) incrementing the consecutive lost packets counter according to a number of consecutive expected packets that are not received;

(630-*i*) resetting the lost packets counter to zero at the end of each analysis period; and (630-*j*) resetting the consecutive lost packets counter to zero when a packet expected based on the history window is received.

In some variants, performing the third group of diagnostics for each analysis period in block 630 can also include the operations of sub-block 630-*k*, where when a value of the consecutive lost packets counter is greater than a maximum consecutive lost packets for the analysis period (e.g., "frerCpsSeqRcvyconsecutiveLossMax"), the TSN node can store the value of the consecutive lost packets counter as the maximum consecutive lost packets for the analysis period.

In some further variants, performing the third group of diagnostics for each analysis period in block 630 can also include the operations of sub-block 630-1, where the TSN node can generate a sixth error signal (SIGNAL_STREAM_LOSS) when the maximum consecutive lost packets for the analysis period is greater than a configurable threshold amount (e.g., "frerCpsSeqRcvyOutageThreshold"). In some of these variants, the sixth error signal (SIGNAL_STREAM_LOSS) includes the following for the analysis period: the maximum consecutive lost packets, and a total number of lost packets as indicated by the lost packets counter (e.g., "frerCpsSeqRcvyLostPackets").

In some embodiments, performing the fourth group of diagnostics in block 630 can include the operations of sub-block 630-*m,* where the TSN node can detect a recovery timeout event associated with the TSN node and generate a seventh error signal (SIGNAL_RECOVERY_TIMEOUT) indicating the recovery timeout.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc.

Figure 7:
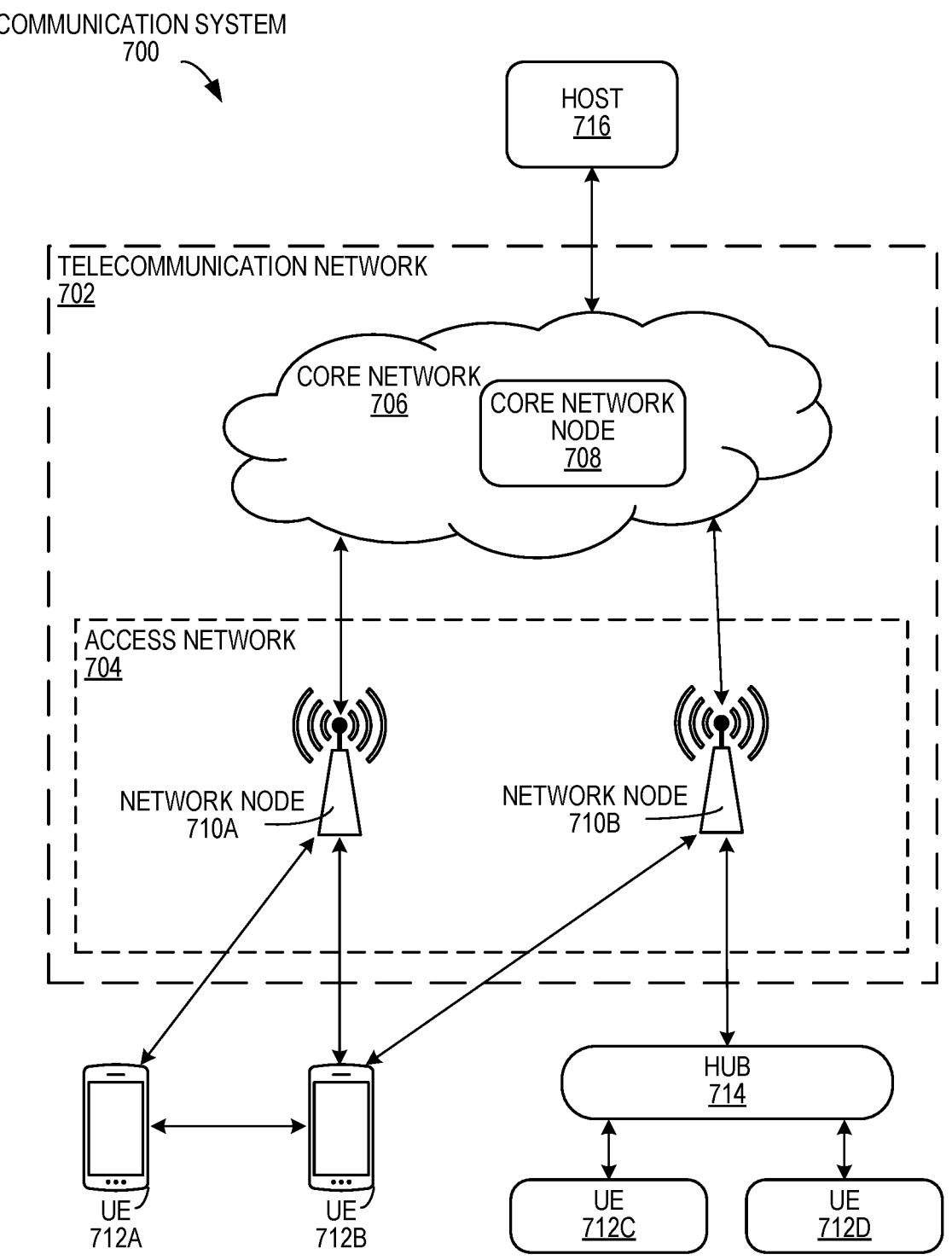
FIG. 7 shows a communication system according to various embodiments of the present disclosure.

FIG. 7 shows an example of a communication system 700 in accordance with some embodiments. In this example, communication system 700 includes a telecommunication network 702 that includes an access network 704 (e.g., RAN) and a core network 706, which includes one or more core network nodes 708. Access network 704 includes one or more access network nodes, such as network nodes 710*a-b* (one or more of which may be generally referred to as network nodes 710), or any other similar 3GPP access node or non-3GPP access point. Network nodes 710 facilitate direct or indirect connection of UEs, such as by connecting UEs 712*a-d* (one or more of which may be generally referred to as UEs 712) to core network 706 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, communication system 700 may include any number of wired or wireless networks, network nodes, UEs, and/or any other components or systems that may facilitate or participate in the communication of data and/or signals whether via wired or wireless connections. Communication system 700 may include and/or interface with any type of communication, telecommunication, data, cellular, radio network, and/or or other similar type of system.

UEs 712 may be any of a wide variety of communication devices, including wireless devices arranged, configured, and/or operable to communicate wirelessly with network nodes 710 and other communication devices. Similarly, network nodes 710 are arranged, capable, configured, and/or operable to communicate directly or indirectly with UEs 712 and/or with other network nodes or equipment in telecommunication network 702 to enable and/or provide network access, such as wireless network access, and/or to perform other functions, such as administration in telecommunication network 702.

In the depicted example, core network 706 connects network nodes 710 to one or more hosts, such as host 716. These connections may be direct or indirect via one or more intermediary networks or devices. In other examples, network nodes may be directly coupled to hosts. Core network

706 includes one more core network nodes (e.g., core network node 708) that are structured with hardware and software components. Features of these components may be substantially similar to those described with respect to the UEs, network nodes, and/or hosts, such that the descriptions thereof are generally applicable to the corresponding components of core network node 708. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

Host 716 may be under the ownership or control of a service provider other than an operator or provider of access network 704 and/or telecommunication network 702, and may be operated by the service provider or on behalf of the service provider. Host 716 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, communication system 700 of FIG. 7 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, telecommunication network 702 is a cellular network that implements 3GPP standardized features. Accordingly, telecommunication network 702 may support network slicing to provide different logical networks to different devices that are connected to telecommunication network 702. For example, telecommunication network 702 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, UEs 712 are configured to transmit and/or receive information without direct human interaction. For instance, a UE may be designed to transmit information to access network 704 on a predetermined schedule, when triggered by an internal or external event, or in response to requests from access network 704. Additionally, a UE may be configured for operating in single- or multi-RAT or multi-standard mode. For example, a UE may operate with any one or combination of Wi-Fi, NR (New Radio) and LTE, i.e., being configured for multi-radio dual connectivity (MR- DC), such as E-UTRAN (Evolved-UMTS Terrestrial Radio Access Network) New Radio-Dual Connectivity (EN-DC).

In the example, hub 714 communicates with access network 704 to facilitate indirect communication between one or more UEs (e.g., UE 712c and/or 712d) and network nodes (e.g., network node 710b). In some examples, hub 714 may be a controller, router, content source and analytics, or any of the other communication devices described herein regarding UEs. For example, hub 714 may be a broadband router enabling access to core network 706 for the UEs. As another example, hub 714 may be a controller that sends commands or instructions to one or more actuators in the UEs. Commands or instructions may be received from the UEs, network nodes 710, or by executable code, script, process, or other instructions in hub 714. As another example, hub 714 may be a data collector that acts as temporary storage for UE data and, in some embodiments, may perform analysis or other processing of the data. As another example, hub 714 may be a content source. For example, for a UE that is a VR headset, display, loudspeaker or other media delivery device, hub 714 may retrieve VR assets, video, audio, or other media or data related to sensory information via a network node, which hub 714 then provides to the UE either directly, after performing local processing, and/or after adding additional local content. In still another example, hub 714 acts as a proxy server or orchestrator for the UEs, in particular in if one or more of the UEs are low energy IoT devices.

Hub 714 may have a constant/persistent or intermittent connection to network node 710b. Hub 714 may also allow for a different communication scheme and/or schedule between hub 714 and UEs (e.g., UE 712c and/or 712d), and between hub 714 and core network 706. In other examples, hub 714 is connected to core network 706 and/or one or more UEs via a wired connection. Moreover, hub 714 may be configured to connect to an M2M service provider over access network 704 and/or to another UE over a direct connection. In some scenarios, UEs may establish a wireless connection with network nodes 710 while still connected via hub 714 via a wired or wireless connection. In some embodiments, hub 714 may be a dedicated hub-that is, a hub whose primary function is to route communications to/from the UEs from/to network node 710b. In other embodiments, hub 714 may be a non-dedicated hub—that is, a device which is capable of operating to route communications between the UEs and network node 710b, but which is additionally capable of operating as a communication start and/or end point for certain data channels.

In various embodiments, one or more of host 716, core network node 708, network node 710, hub 714, and UE 712 can be configured as a TSN node capable of performing various exemplary methods (e.g., procedures) described above.

Figure 8:
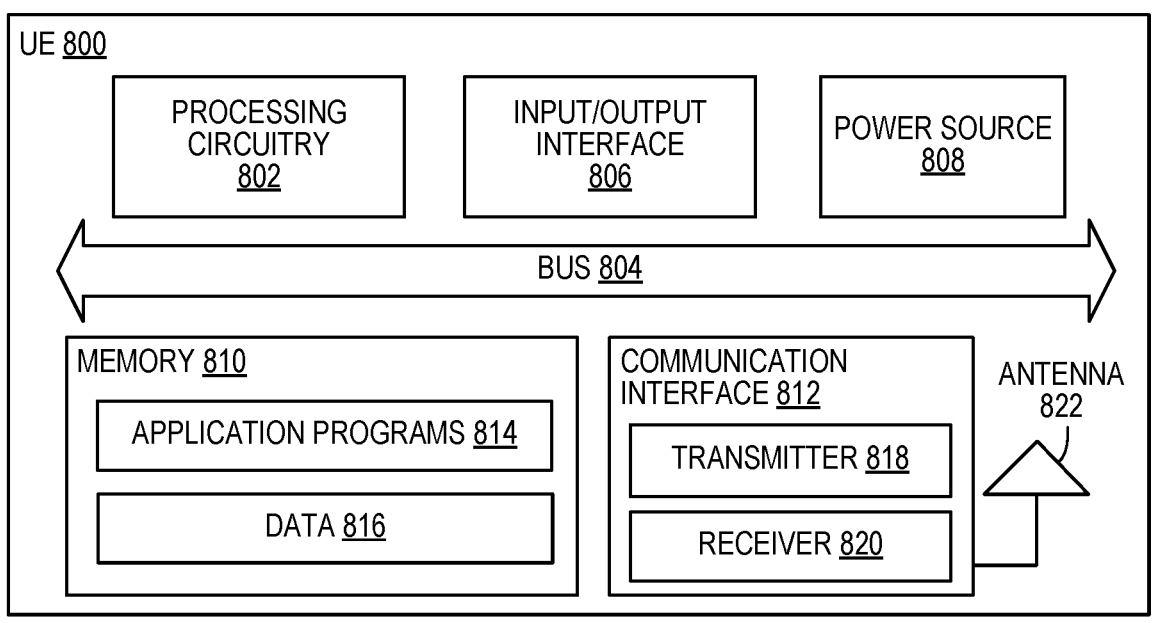
FIG. 8 shows a UE according to various embodiments of the present disclosure.

FIG. 8 shows a UE 800 in accordance with some embodiments. Examples of a UE include, but are not limited to, a smart phone, mobile phone, cell phone, voice over IP (VOIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by 3GPP, including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

UE 800 includes processing circuitry 802 that is operatively coupled via a bus 804 to an input/output interface 806, a power source 808, a memory 810, a communication interface 812, and/or any other component, or any combination thereof. Certain UEs may utilize all or a subset of the components shown in FIG. 8. The level of integration between the components may vary from one UE to another UE. Further, certain UEs may contain multiple instances of a component, such as multiple processors, memories, transceivers, transmitters, receivers, etc.

Processing circuitry 802 is configured to process instructions and data and may be configured to implement any sequential state machine operative to execute instructions stored as machine-readable computer programs in memory 810 (collectively referred to as computer program product). Processing circuitry 802 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, processing circuitry 802 may include multiple central processing units (CPUs).

In the example, input/output interface 806 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into UE 800. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, power source 808 is structured as a battery or battery pack. Other types of power sources, such as an external power source (e.g., an electricity outlet), photovoltaic device, or power cell, may be used. Power source 808 may further include power circuitry for delivering power from power source 808 itself, and/or an external power source, to the various parts of UE 800 via input circuitry or an interface such as an electrical power cable. Delivering power may be, for example, for charging of power source 808. Power circuitry may perform any formatting, converting, or other modification to the power from power source 808 to make the power suitable for the respective components of UE 800 to which power is supplied.

Memory 810 may be or be configured to include memory such as random access memory (RAM), read-only memory (ROM), programmable read-only memory (PROM), erasable programmable read-only memory (EPROM), electrically erasable programmable read-only memory (EE-PROM), magnetic disks, optical disks, hard disks, removable cartridges, flash drives, and so forth. In one example, memory 810 includes one or more application programs 814, such as an operating system, web browser application, a widget, gadget engine, or other application, and corresponding data 816. Memory 810 may store, for use by UE 800, any of a variety of various operating systems or combinations of operating systems.

Memory 810 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' Memory 810 may allow UE 800 to access instructions, application programs and the like, stored on transitory or non-transitory memory media, to off-load data, or to upload data. An article of manufacture, such as one utilizing a communication system may be tangibly embodied as or in memory 810, which may be or comprise a device-readable storage medium.

Processing circuitry 802 may be configured to communicate with an access network or other network using communication interface 812. Communication interface 812 may comprise one or more communication subsystems and may include or be communicatively coupled to an antenna 822. Communication interface 812 may include one or more transceivers used to communicate, such as by communicating with one or more remote transceivers of another device capable of wireless communication (e.g., another UE or a network node in an access network). Each transceiver may include a transmitter 818 and/or a receiver 820 appropriate to provide network communications (e.g., optical, electrical, frequency allocations, and so forth). Moreover, transmitter 818 and receiver 820 may be coupled to one or more antennas (e.g., antenna 822) and may share circuit components, software or firmware, or alternatively be implemented separately.

In the illustrated embodiment, communication functions of communication interface 812 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 812, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., an alert is sent when moisture is detected), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal-or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to UE 800 shown in FIG. 8.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g., by controlling an actuator) to increase or decrease the drone's speed. The first and/or the second UE can also include more than one of the functionalities described above. For example, a UE might comprise the sensor and the actuator, and handle communication of data for both the speed sensor and the actuators.

In some embodiments, UE 800 can be configured as a TSN node capable of performing various exemplary methods (e.g., procedures) described above.

Figure 9:
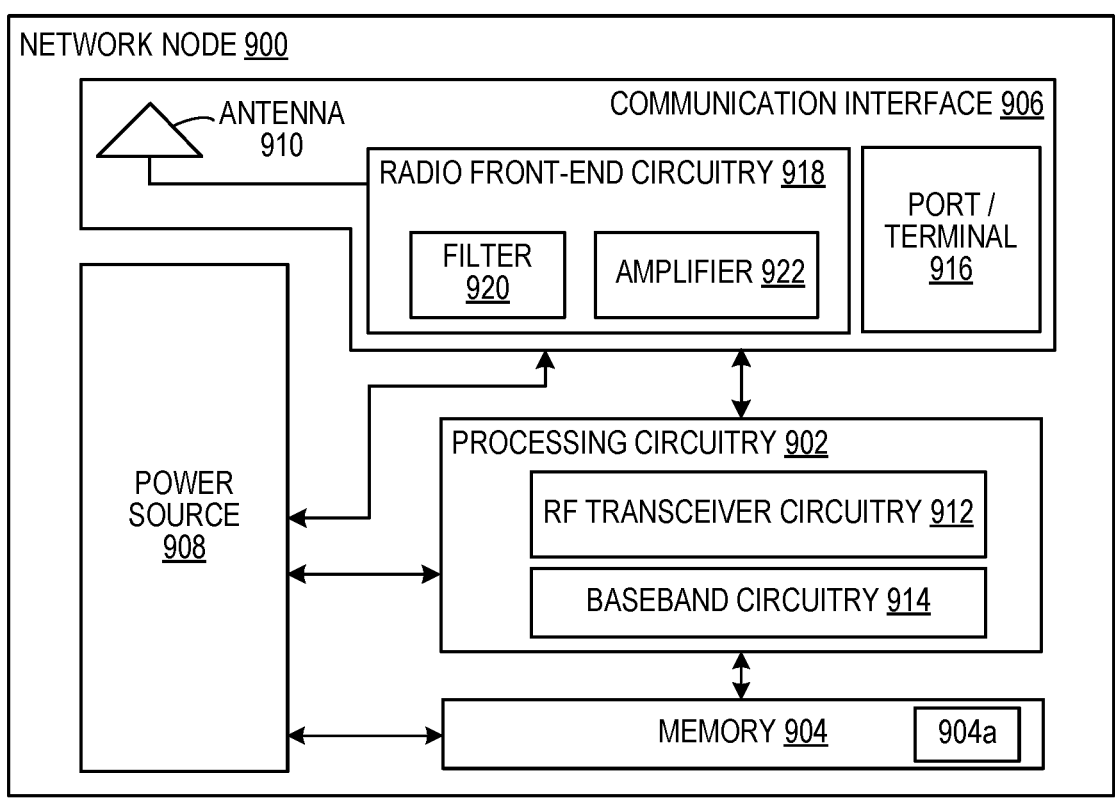
FIG. 9 shows a network node according to various embodiments of the present disclosure.

FIG. 9 shows a network node 900 in accordance with some embodiments. Examples of network nodes include, but are not limited to, access points (e.g., radio access points) and base stations (e.g., radio base stations, Node Bs, eNBs, and gNBs).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

Network node 900 includes a processing circuitry 902, a memory 904, a communication interface 906, and a power source 908. Network node 900 may be composed of multiple physically separate components (e.g., a NodeB component and a RNC component, or a BTS component and a BSC component, etc.), which may each have their own respective components. In certain scenarios in which network node 900 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 900 may be configured to support multiple radio access technologies (RATs). In such embodiments, some components may be duplicated (e.g., separate memory 904 for different RATs) and some components may be reused (e.g., a same antenna 910 may be shared by different RATs). Network node 900 may also include multiple sets of the various illustrated components for different wireless technologies integrated into network node 900, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 900.

Processing circuitry 902 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 900 components, such as memory 904, to provide network node 900 functionality.

In some embodiments, processing circuitry 902 includes a system on a chip (SOC). In some embodiments, processing circuitry 902 includes one or more of radio frequency (RF) transceiver circuitry 912 and baseband processing circuitry 914. In some embodiments, RF transceiver circuitry 912 and baseband processing circuitry 914 may be on separate chips (or sets of chips), boards, or units, such as radio units and digital units. In alternative embodiments, part or all of RF transceiver circuitry 912 and baseband processing circuitry 914 may be on the same chip or set of chips, boards, or units.

Memory 904 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by processing circuitry 902. Memory 904 may store any suitable instructions, data, or information, including a computer program, software, an application including one or more of logic, rules, code, tables, and/or other instructions (collectively denoted computer program product 904a) capable of being executed by processing circuitry 902 and utilized by network node 900. Memory 904 may be used to store any calculations made by processing circuitry 902 and/or any data received via communication interface 906. In some embodiments, processing circuitry 902 and memory 904 is integrated.

Communication interface 906 is used in wired or wireless communication of signaling and/or data between a network node, access network, and/or UE. As illustrated, communication interface 906 comprises port(s)/terminal(s) 916 to send and receive data, for example to and from a network over a wired connection. Communication interface 906 also includes radio front-end circuitry 918 that may be coupled to, or in certain embodiments a part of, antenna 910. Radio front-end circuitry 918 comprises filters 920 and amplifiers 922. Radio front-end circuitry 918 may be connected to an antenna 910 and processing circuitry 902. The radio front-end circuitry may be configured to condition signals communicated between antenna 910 and processing circuitry 902. Radio front-end circuitry 918 may receive digital data that is to be sent out to other network nodes or UEs via a wireless connection. Radio front-end circuitry 918 may convert the digital data into a radio signal having the appropriate channel and bandwidth parameters using a combination of filters 920 and/or amplifiers 922. The radio signal may then be transmitted via antenna 910. Similarly, when receiving data, antenna 910 may collect radio signals which are then converted into digital data by radio front-end circuitry 918. The digital data may be passed to processing circuitry 902. In other embodiments, the communication interface may comprise different components and/or different combinations of components.

In certain alternative embodiments, network node 900 does not include separate radio front-end circuitry 918, instead, processing circuitry 902 includes radio front-end circuitry and is connected to antenna 910. Similarly, in some embodiments, all or some of RF transceiver circuitry 912 is part of communication interface 906. In still other embodiments, communication interface 906 includes one or more ports or terminals 916, radio front-end circuitry 918, and RF transceiver circuitry 912, as part of a radio unit (not shown), and communication interface 906 communicates with baseband processing circuitry 914, which is part of a digital unit (not shown).

Antenna 910 may include one or more antennas, or antenna arrays, configured to send and/or receive wireless signals. Antenna 910 may be coupled to radio front-end circuitry 918 and may be any type of antenna capable of transmitting and receiving data and/or signals wirelessly. In certain embodiments, antenna 910 is separate from network node 900 and connectable to network node 900 through an interface or port.

Antenna 910, communication interface 906, and/or processing circuitry 902 may be configured to perform any receiving operations and/or certain obtaining operations described herein as being performed by the network node. Any information, data and/or signals may be received from a UE, another network node and/or any other network equipment. Similarly, antenna 910, communication interface 906, and/or processing circuitry 902 may be configured to perform any transmitting operations described herein as being performed by the network node. Any information, data and/or signals may be transmitted to a UE, another network node and/or any other network equipment.

Power source 908 provides power to the various components of network node 900 in a form suitable for the respective components (e.g., at a voltage and current level needed for each respective component). Power source 908 may further comprise, or be coupled to, power management circuitry to supply the components of network node 900 with power for performing the functionality described herein. For example, network node 900 may be connectable to an external power source (e.g., the power grid, an electricity outlet) via an input circuitry or interface such as an electrical cable, whereby the external power source supplies power to power circuitry of power source 908. As a further example, power source 908 may comprise a source of power in the form of a battery or battery pack which is connected to, or integrated in, power circuitry. The battery may provide backup power should the external power source fail.

Embodiments of network node 900 may include additional components beyond those shown in FIG. 9 for providing certain aspects of the network node's functionality, including any of the functionality described herein and/or any functionality necessary to support the subject matter described herein. For example, network node 900 may include user interface equipment to allow input of information into network node 900 and to allow output of information from network node 900. This may allow a user to perform diagnostic, maintenance, repair, and other administrative functions for network node 900.

In some embodiments, network node 900 can be configured as a TSN node capable of performing various exemplary methods (e.g., procedures) described above.

Figure 10:
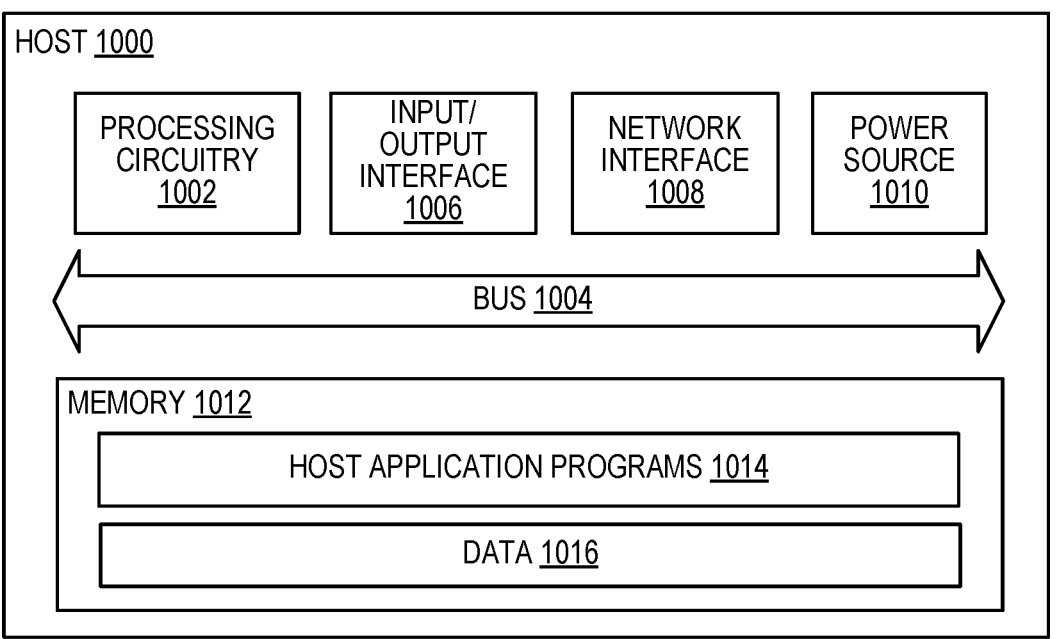
FIG. 10 shows host computing system according to various embodiments of the present disclosure.

FIG. 10 is a block diagram of a host 1000, which may be an embodiment of host 716 of FIG. 7, in accordance with various aspects described herein. As used herein, host 1000 may be or comprise various combinations hardware and/or software, including a standalone server, a blade server, a cloud-implemented server, a distributed server, a virtual machine, container, or processing resources in a server farm. Host 1000 may provide one or more services to one or more UEs.

Host 1000 includes processing circuitry 1002 that is operatively coupled via a bus 1004 to an input/output interface 1006, a network interface 1008, a power source 1010, and a memory 1012. Other components may be included in other embodiments. Features of these components may be substantially similar to those described with respect to the devices of previous figures, such as FIGS. 8 and 9, such that the descriptions thereof are generally applicable to the corresponding components of host 1000.

Memory 1012 may include one or more computer programs including one or more host application programs 1014 and data 1016, which may include user data, e.g., data generated by a UE for host 1000 or data generated by host 1000 for a UE. Embodiments of host 1000 may utilize only a subset or all of the components shown. Host application programs 1014 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). Host application programs 1014 may also provide for user authentication and licensing checks and may periodically report health, routes, and content availability to a central node, such as a device in or on the edge of a core network. Accordingly, host 1000 may select and/or indicate a different host for over-the-top services for a UE. Host application programs 1014 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

In some embodiments, host 1000 can be configured as a TSN node capable of performing various exemplary methods (e.g., procedures) described above.

Figure 11:
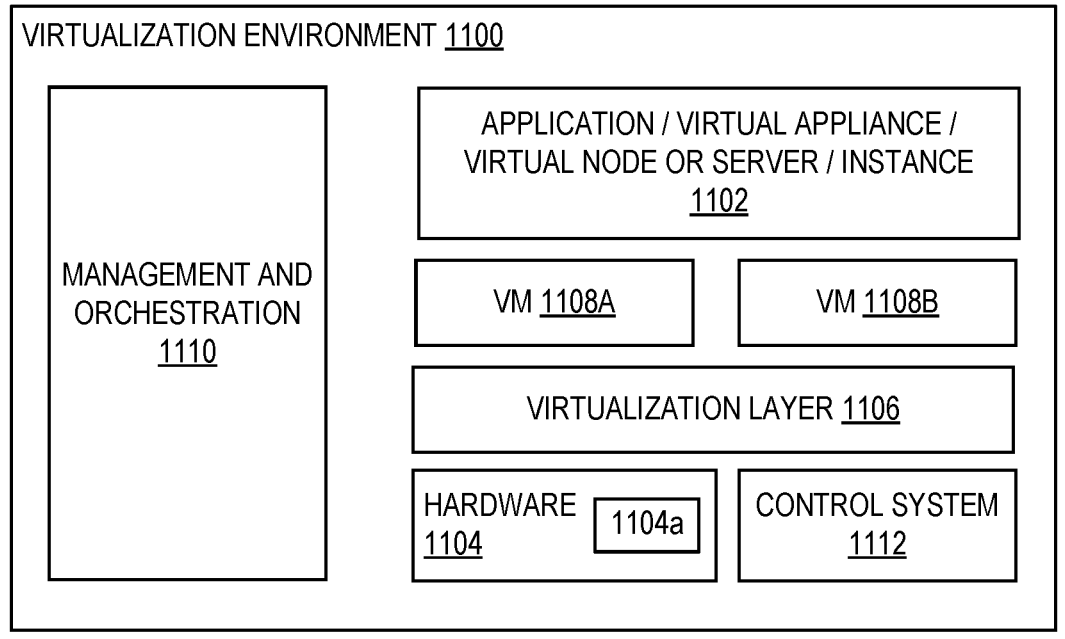
FIG. 11 is a block diagram of a virtualization environment in which functions implemented by some embodiments of the present disclosure may be virtualized.

FIG. 11 is a block diagram illustrating a virtualization environment 1100 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1100 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1102 (which may alternatively be called software instances, virtual appliances, network functions, virtual nodes, virtual network functions, etc.) are run in the virtualization environment 1100 to implement some of the features, functions, and/or benefits of some of the embodiments disclosed herein.

Hardware 1104 includes processing circuitry, memory that stores software and/or instructions (collectively denoted computer program product 1104a) executable by hardware processing circuitry, and/or other hardware devices as described herein, such as a network interface, input/output interface, and so forth. Software may be executed by the processing circuitry to instantiate one or more virtualization layers 1106 (also referred to as hypervisors or virtual machine monitors (VMMs)), provide VMs 1108a-b (one or more of which may be generally referred to as VMs 1108), and/or perform any of the functions, features and/or benefits described in relation with some embodiments described herein. The virtualization layer 1106 may present a virtual operating platform appearing as networking hardware to the VMs 1108.

VMs 1108 comprise virtual processing, virtual memory, virtual networking or interface and virtual storage, and may be run by a corresponding virtualization layer 1106. Different embodiments of the instance of a virtual appliance 1102 may be implemented on one or more of VMs 1108, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, VM 1108 may be a software implementation of a physical machine that runs programs as if they were executing on a physical, non-virtualized machine. Each VM 1108, and that part of hardware 1104 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1108 on top of hardware 1104 and corresponds to application 1102.

Hardware 1104 may be implemented in a standalone network node with generic or specific components. Hardware 1104 may implement some functions via virtualization. Alternatively, hardware 1104 may be part of a larger cluster of hardware (e.g., such as in a data center or CPE) where many hardware nodes work together and are managed via management and orchestration 1110, which, among others, oversees lifecycle management of applications 1102. In some embodiments, hardware 1104 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1112 which may alternatively be used for communication between hardware nodes and radio units.

In some embodiments, one or more TSN nodes capable of performing various exemplary methods (e.g., procedures) described above can be hosted by virtualization environment 1100, e.g., as respective virtual nodes 1102.

Figure 12:
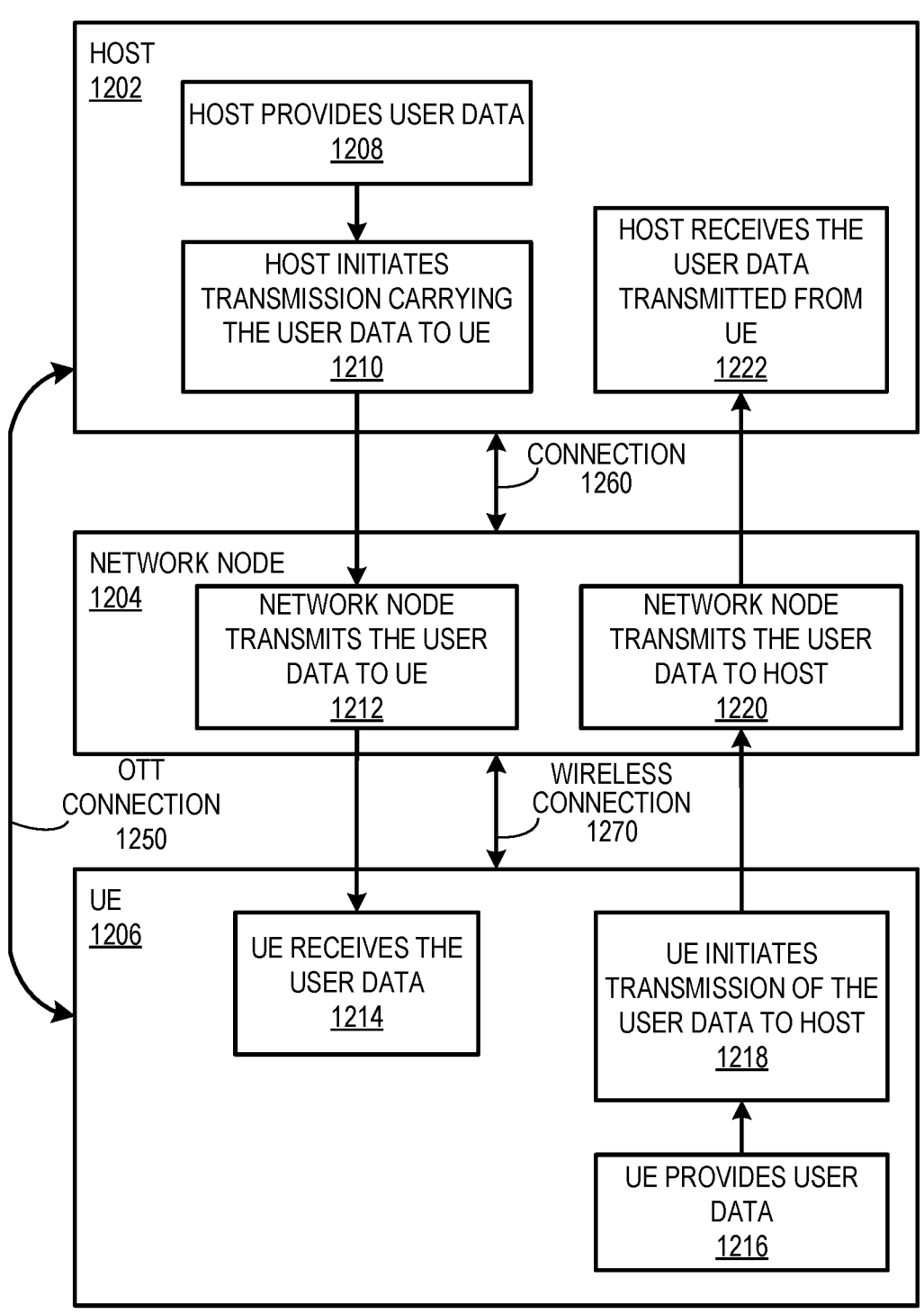
FIG. 12 illustrates communication between a host computing system, a network node, and a UE via multiple connections, according to various embodiments of the present disclosure.

FIG. 12 shows a communication diagram of a host 1202 communicating via a network node 1204 with a UE 1206 over a partially wireless connection in accordance with some embodiments. Example implementations, in accordance with various embodiments, of the UE (such as a UE 712a of FIG. 7 and/or UE 800 of FIG. 8), network node (such as network node 710a of FIG. 7 and/or network node 900 of FIG. 9), and host (such as host 716 of FIG. 7 and/or host 1000 of FIG. 10) discussed in the preceding paragraphs will now be described with reference to FIG. 12.

Like host 1000, embodiments of host 1202 include hardware, such as a communication interface, processing circuitry, and memory. Host 1202 also includes software, which is stored in or accessible by host 1202 and executable by the processing circuitry. The software includes a host application that may be operable to provide a service to a remote user, such as UE 1206 connecting via an over-the-top (OTT) connection 1250 extending between UE 1206 and host 1202. In providing the service to the remote user, a host application may provide user data which is transmitted using OTT connection 1250.

Network node 1204 includes hardware enabling it to communicate with host 1202 and UE 1206. Connection 1260 may be direct or pass through a core network (like core network 706 of FIG. 7) and/or one or more other intermediate networks, such as one or more public, private, or hosted networks. For example, an intermediate network may be a backbone network or the Internet.

UE 1206 includes hardware and software, which is stored in or accessible by UE 1206 and executable by the UE's processing circuitry. The software includes a client application, such as a web browser or operator-specific "app" that may be operable to provide a service to a human or non-human user via UE 1206 with the support of host 1202. In host 1202, an executing host application may communicate with the executing client application via OTT connection 1250 terminating at UE 1206 and host 1202. In providing the service to the user, the UE's client application may receive request data from the host's host application and provide user data in response to the request data. OTT connection 1250 may transfer both the request data and the user data. The UE's client application may interact with the user to generate the user data that it provides to the host application through OTT connection 1250.

OTT connection 1250 may extend via a connection 1260 between host 1202 and network node 1204 and via a wireless connection 1270 between network node 1204 and UE 1206 to provide the connection between host 1202 and UE 1206. Connection 1260 and wireless connection 1270, over which OTT connection 1250 may be provided, have been drawn abstractly to illustrate the communication between host 1202 and UE 1206 via network node 1204, without explicit reference to any intermediary devices and the precise routing of messages via these devices.

As an example of transmitting data via OTT connection 1250, in step 1208, host 1202 provides user data, which may be performed by executing a host application. In some embodiments, the user data is associated with a particular human user interacting with UE 1206. In other embodiments, the user data is associated with a UE 1206 that shares data with host 1202 without explicit human interaction. In step 1210, host 1202 initiates a transmission carrying the user data towards UE 1206. Host 1202 may initiate the transmission responsive to a request transmitted by UE 1206. The request may be caused by human interaction with UE 1206 or by operation of the client application executing on UE 1206. The transmission may pass via network node 1204, in accordance with the teachings of the embodiments described throughout this disclosure. Accordingly, in step 1212, network node 1204 transmits to UE 1206 the user data that was carried in the transmission that host 1202 initiated, in accordance with the teachings of the embodiments described throughout this disclosure. In step 1214, UE 1206 receives the user data carried in the transmission, which may be performed by a client application executed on UE 1206 associated with the host application executed by host 1202.

In some examples, UE 1206 executes a client application which provides user data to host 1202. The user data may be provided in reaction or response to the data received from host 1202. Accordingly, in step 1216, UE 1206 may provide user data, which may be performed by executing the client application. In providing the user data, the client application may further consider user input received from the user via an input/output interface of UE 1206. Regardless of the specific manner in which the user data was provided, UE 1206 initiates, in step 1218, transmission of the user data towards host 1202 via network node 1204. In step 1220, in accordance with the teachings of the embodiments described throughout this disclosure, network node 1204 receives user data from UE 1206 and initiates transmission of the received user data towards host 1202. In step 1222, host 1202 receives the user data carried in the transmission initiated by UE 1206.

In various embodiments, one or more of host 1202, network node 1204, and UE 1206 can be configured as a TSN node capable of performing various exemplary methods (e.g., procedures) described above.

One or more of the various embodiments improve the performance of OTT services provided to UE 1206 using OTT connection 1250, in which wireless connection 1270 forms the last segment. More precisely, embodiments described herein provide improved diagnostic outputs for TSN nodes supporting frame replication and elimination for reliability (FRER), which facilitate detection of various errors, misconfigurations, and possible attacks against member streams. As such, embodiments can facilitate more accurate detection of network failure scenarios, thereby providing increased reliability of deployed TSN/DetNet. By improving network reliability in this manner, embodiments increase the value of OTT services delivered over such networks to both end users and service providers.

In an example scenario, factory status information may be collected and analyzed by host 1202. As another example, host 1202 may process audio and video data which may have been retrieved from a UE for use in creating maps. As another example, host 1202 may collect and analyze real-time data to assist in controlling vehicle congestion (e.g., controlling traffic lights). As another example, host 1202 may store surveillance video uploaded by a UE. As another example, host 1202 may store or control access to media content such as video, audio, VR or AR which it can broadcast, multicast or unicast to UEs. As other examples, host 1202 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring OTT connection 1250 between host 1202 and UE 1206, in response to variations in the measurement results. The measurement procedure and/or the network functionality for reconfiguring the OTT connection may be implemented in software and hardware of host 1202 and/or UE 1206. In some embodiments, sensors (not shown) may be deployed in or in association with other devices through which OTT connection 1250 passes; the sensors may participate in the measurement procedure by supplying values of the monitored quantities exemplified above, or supplying values of other physical quantities from which software may compute or estimate the monitored quantities. Reconfiguring OTT connection 1250 may include message format, retransmission settings, preferred routing etc.; the reconfiguring need not directly alter the operation of network node 1204. Such procedures and functionalities may be known and practiced in the art. In certain embodiments, measurements may involve proprietary UE signaling that facilitates measurements of throughput, propagation times, latency and the like, by host 1202. The measurements may be implemented in that software causes messages to be transmitted, in particular empty or 'dummy' messages, using OTT connection 1250 while monitoring propagation times, errors, etc.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously.

Embodiments of the techniques and apparatus described herein also include, but are not limited to, the following enumerated examples:

A1. A method performed by a time-sensitive network (TSN) node configured for frame replication and elimination for reliability (FRER), the method comprising:

receiving a plurality of member streams via a corresponding plurality (n) of disjoint paths in the TSN, wherein each member stream includes a replication of packets comprising a stream; and performing the following diagnostics on the received member streams:

a first group of diagnostics related to member stream failures, a second group of diagnostics related to packets received out-of-window, a third group of diagnostics related to stream outages, and a fourth group of diagnostics related to recovery timeouts for the TSN node.

A2. The method of embodiment A1, further comprising for each packet comprising the stream, retaining the packet received on one of the member streams and discarding duplicates of the packet received on other of the member streams.

A3. The method of any of embodiments A1-A2, wherein the first, second, and third groups of diagnostics are performed on the received member streams during each of a plurality of consecutive analysis periods.

A4. The method of embodiment A3, wherein performing the first group of diagnostics for each analysis period comprises determining a number of packets retained and a number of duplicate packets discarded during each analysis period.

A5. The method of embodiment A4, wherein performing the first group of diagnostics for each analysis period further comprises, when the number of duplicate packets discarded is at least a configured threshold amount less than ((n−1) times the number of packets retained) during an analysis period, entering a packet loss state and generating one or more of the following:

a first error signal (SIGNAL_PACKET_ABSENT) indicating detection of packet loss in one or more member streams;

a second error signal (SIGNAL_DYSFUNCTIONAL_PATHS) indicating a number of dysfunctional paths; and a third error signal (SIGNAL_LATENT_ERROR) indicating the packet loss state.

A6. The method of embodiment A5, wherein the number of dysfunctional paths, indicated by the second error signal, is based on a ratio between the following during the analysis period: the number of duplicate packets discarded and the number of packets retained.

A7. The method of any of embodiments A5-A6, wherein performing the first group of diagnostics for each analysis period further comprises exiting the packet loss state and entering a normal state of operation, when the number of duplicate packets discarded is no longer at least a configured threshold amount less than ((n−1)*the number of packets retained) during the analysis period or during a subsequent analysis period, A8. The method of any of embodiments A4-A6, wherein performing the first group of diagnostics for each analysis period further comprises generating a fourth error signal (SIGNAL_MORE_PACKETS_THAN_EXPECTED) and entering a too-many-packets-received state, when the number of packets retained during an analysis period is at least a configured threshold amount greater than an expected number of packets retained.

A9. The method of embodiment A8, wherein the fourth error signal (SIGNAL_MORE_PACKETS_THAN_EX-PECTED) includes an indication of the number of packets retained greater than the expected number of packets retained, as a percentage of number of expected packets from each member stream during the analysis period.

A10. The method of any of embodiments A3-A9, wherein each packet includes a sequence number and the TSN node is configured with a lost packets counter and a history window indicating a range of consecutive packet sequence numbers.

A11. The method of embodiment A10, wherein performing the second group of diagnostics for each analysis period comprises generating a fifth error signal (SIGNAL_OUT-OFWINDOW_PACKETS) when one or more packets retained, during an analysis period, have respective sequence numbers outside of the history window.

A12. The method of embodiment A11, wherein:

the TSN node is configured with a rogue packet counter, which is incremented by a number of packets retained during an analysis period with sequence numbers outside of the history window; and the fifth error signal (SIGNAL_OUTOFWINDOW_PACKETS) is generated when a value of the rogue packet counter for an analysis period is greater than a previous value of the rogue packet counter for a most recent analysis period.

A13. The method of embodiment A12, wherein the fifth error signal (SIGNAL_OUTOFWINDOW_PACKETS) includes the value of the rogue packet counter for the analysis period.

A14. The method of any of embodiments A10-A13, wherein performing the third group of diagnostics for each analysis period further comprises refraining from incrementing the lost packets counter for up to (size of the history window-1) consecutive lost packets immediately after a reset of the TSN node.

A15. The method of any of embodiments A10-A14, wherein:
  the TSN node is configured with a consecutive lost packets counter; and
  performing the third group of diagnostics for each analysis period comprises:
    incrementing the lost packets counter for each packet expected based on the history window but not received;
    incrementing the consecutive lost packets counter according to a number of consecutive expected packets that are not received;
    resetting the lost packets counter to zero at the end of each analysis period; and
    resetting the consecutive lost packets counter to zero when a packet expected based on the history window is received.

A16. The method of embodiment A15, wherein performing the third group of diagnostics for each analysis period further comprises when a value of the consecutive lost packets counter is greater than a maximum consecutive lost packets for the analysis period, storing the value of the consecutive lost packets counter as the maximum consecutive lost packets for the analysis period.

A17. The method of embodiment A16, wherein performing the third group of diagnostics for each analysis period further comprises generating a sixth error signal (SIGNAL_STREAM_LOSS) when the maximum consecutive lost packets for the analysis period is greater than a configurable threshold amount.

A18. The method of embodiment A17, wherein the sixth error signal (SIGNAL_STREAM_LOSS) includes the following for the analysis period: the maximum consecutive lost packets, and a total number of lost packets as indicated by the lost packets counter.

A19. The method of any of embodiments A1-A18, wherein performing the fourth group of diagnostics comprises detecting a recovery timeout event associated with the TSN node and generating a seventh error signal (SIGNAL_RECOVERY_TIMEOUT) indicating the recovery timeout.

B1. A time-sensitive network (TSN) node configured for frame replication and elimination for reliability (FRER), the TSN node comprising:
  communication interface circuitry configured to communicate with one or more other TSN nodes; and
  processing circuitry operably coupled to the communication interface circuitry, whereby the processing circuitry and the communication interface circuitry are configured to perform operations corresponding to any of the methods of embodiments A1-A19.

B2. A time-sensitive network (TSN) node configured for frame replication and elimination for reliability (FRER), the TSN node being further configured to perform operations corresponding to any of the methods of embodiments A1-A19.

B3. A non-transitory, computer-readable medium storing program instructions that, when executed by processing circuitry of time-sensitive network (TSN) node configured for frame replication and elimination for reliability (FRER), configure the TSN node to perform operations corresponding to any of the methods of embodiments A1-A19.

B4. A computer program product comprising program instructions that, when executed by processing circuitry of time-sensitive network (TSN) node configured for frame replication and elimination for reliability (FRER), configure the TSN node to perform operations corresponding to any of the methods of embodiments A1-A19.

The invention claimed is:

1. A method performed by a time-sensitive network (TSN) node configured for frame replication and elimination for reliability (FRER), the method comprising:
  receiving a plurality of member streams via a corresponding plurality (n) of disjoint paths in the TSN, wherein each member stream includes a replication of packets comprising a stream; and
  performing the following diagnostics on the received member streams:
    a first group of diagnostics related to member stream failures,
    a second group of diagnostics related to packets received out-of-window,
    a third group of diagnostics related to stream outages, and
    a fourth group of diagnostics related to recovery timeouts for the TSN node,
  wherein the first, second, and third groups of diagnostics are performed on the received member streams during each of a plurality of consecutive analysis periods and one or more of the following applies:
    performing the first group of diagnostics for each analysis period comprises determining a number of packets retained and a number of duplicate packets discarded during each analysis period; and
    each packet includes a sequence number and the TSN node is configured with a lost packets counter and a history window indicating a range of consecutive packet sequence numbers, based on which the second group of diagnostics are performed.

2. The method of claim 1, further comprising, for each packet comprising the stream, retaining the packet received on one of the member streams and discarding duplicates of the packet received on other of the member streams.

3. The method of claim 1, wherein performing the first group of diagnostics for each analysis period further comprises, when the number of duplicate packets discarded during an analysis period is at least a configured threshold amount less than ((n minus 1) times the number of packets retained during the analysis period), entering a packet loss state and generating one or more of the following:
  a first error signal (SIGNAL_PACKET_ABSENT) indicating detection of packet loss in one or more member streams;
  a second error signal (SIGNAL_DYSFUNCTIONAL_PATHS) indicating a number of dysfunctional paths; and
  a third error signal (SIGNAL_LATENT_ERROR) indicating the packet loss state.

4. The method of claim 3, wherein the number of dysfunctional paths, indicated by the second error signal, is based on a ratio between the following during the analysis period: the number of duplicate packets discarded, and the number of packets retained.

5. The method of claim 3, wherein performing the first group of diagnostics for each analysis period further comprises exiting the packet loss state and entering a normal state of operation when the number of duplicate packets discarded during a subsequent analysis period is no longer at least the configured threshold amount less than ((n minus 1) times the number of packets retained during the subsequent analysis period).

6. The method of claim 1, wherein performing the first group of diagnostics for each analysis period further comprises generating a fourth error signal (SIGNAL_MORE_PACKETS_THAN_EXPECTED) and entering a too-many-packets-received state, when the number of packets retained during an analysis period is at least a configured threshold amount greater than an expected number of packets retained during the analysis period.

7. The method of claim 6, wherein the fourth error signal (SIGNAL_MORE_PACKETS_THAN_EXPECTED) includes an indication of how many packets more than the expected number of packets were retained, as a percentage of number of expected packets from each member stream during the analysis period.

8. The method of claim 1, wherein performing the second group of diagnostics for each analysis period comprises generating a fifth error signal (SIGNAL_OUTOFWINDOW_PACKETS) when one or more packets retained, during an analysis period, have respective sequence numbers outside of the history window.

9. The method of claim 8, wherein:

the TSN node is configured with a rogue packet counter, which is incremented by a number of packets with sequence numbers outside of the history window that are retained during each analysis period; and the fifth error signal (SIGNAL_OUTOFWINDOW_PACKETS) is generated when a value of the rogue packet counter for an analysis period is greater than a previous value of the rogue packet counter for a most recent analysis period.

10. The method of claim 9, wherein the fifth error signal (SIGNAL_OUTOFWINDOW_PACKETS) includes the value of the rogue packet counter for the analysis period.

11. The method of claim 1, wherein performing the third group of diagnostics for each analysis period comprises refraining from incrementing the lost packets counter for up to (size of the history window minus 1) consecutive lost packets immediately after a reset of the TSN node.

12. The method of claim 1, wherein:

the TSN node is configured with a consecutive lost packets counter; and performing the third group of diagnostics for each analysis period comprises:

incrementing the lost packets counter for each packet expected based on the history window but not received;

incrementing the consecutive lost packets counter according to a number of consecutive expected packets that are not received;

resetting the lost packets counter to zero at the end of each analysis period; and resetting the consecutive lost packets counter to zero when a packet expected based on the history window is received.

13. The method of claim 12, wherein performing the third group of diagnostics for each analysis period further comprises, when a value of the consecutive lost packets counter is greater than a maximum consecutive lost packets for an analysis period, storing the value of the consecutive lost packets counter as the maximum consecutive lost packets for the analysis period.

14. The method of claim 13, wherein performing the third group of diagnostics for each analysis period further comprises generating a sixth error signal (SIGNAL_STREAM_LOSS) when the maximum consecutive lost packets for the analysis period is greater than a configurable threshold amount.

15. The method of claim 14, wherein the sixth error signal (SIGNAL_STREAM_LOSS) includes the following for the analysis period: the maximum consecutive lost packets, and a total number of lost packets as indicated by the lost packets counter.

16. The method of claim 1, wherein performing the fourth group of diagnostics comprises detecting a recovery timeout event associated with the TSN node and generating a seventh error signal (SIGNAL_RECOVERY_TIMEOUT) indicating the recovery timeout.

17. A time-sensitive network (TSN) node configured for frame replication and elimination for reliability (FRER), the TSN node comprising:

communication interface circuitry configured to communicate with one or more other TSN nodes; and processing circuitry operably coupled to the communication interface circuitry, wherein the processing circuitry and the communication interface circuitry are configured to:

receive a plurality of member streams via a corresponding plurality (n) of disjoint paths in the TSN, wherein each member stream includes a replication of packets comprising a stream; and perform the following diagnostics on the received member streams:

a first group of diagnostics related to member stream failures, a second group of diagnostics related to packets received out-of-window, a third group of diagnostics related to stream outages, and a fourth group of diagnostics related to recovery timeouts for the TSN node, wherein the first, second, and third groups of diagnostics are performed on the received member streams during each of a plurality of consecutive analysis periods and one or more of the following applies:

the first group of diagnostics are performed for each analysis period based on determining a number of packets retained and a number of duplicate packets discarded during each analysis period; and the TSN node is configured with a lost packets counter and a history window indicating a range of consecutive packet sequence numbers, based on which the second group of diagnostics are performed.

18. The TSN node of claim 17, wherein the processing circuitry and the communication interface circuitry are further configured to, for each packet comprising the stream, retain the packet received on one of the member streams and discard duplicates of the packet received on other of the member streams.

19. The TSN node of claim 17, wherein the processing circuitry and the communication interface circuitry are configured to perform the third group of diagnostics for each analysis period based on refraining from incrementing the lost packets counter for up to (size of the history window minus 1) consecutive lost packets immediately after a reset of the TSN node.

20. The TSN node of claim 17, wherein the processing circuitry and the communication interface circuitry are configured to perform the fourth group of diagnostics based on detecting a recovery timeout event associated with the TSN node and generating a seventh error signal (SIGNAL_RE-COVERY_TIMEOUT) indicating the recovery timeout.

* * * * *